Figure 6:
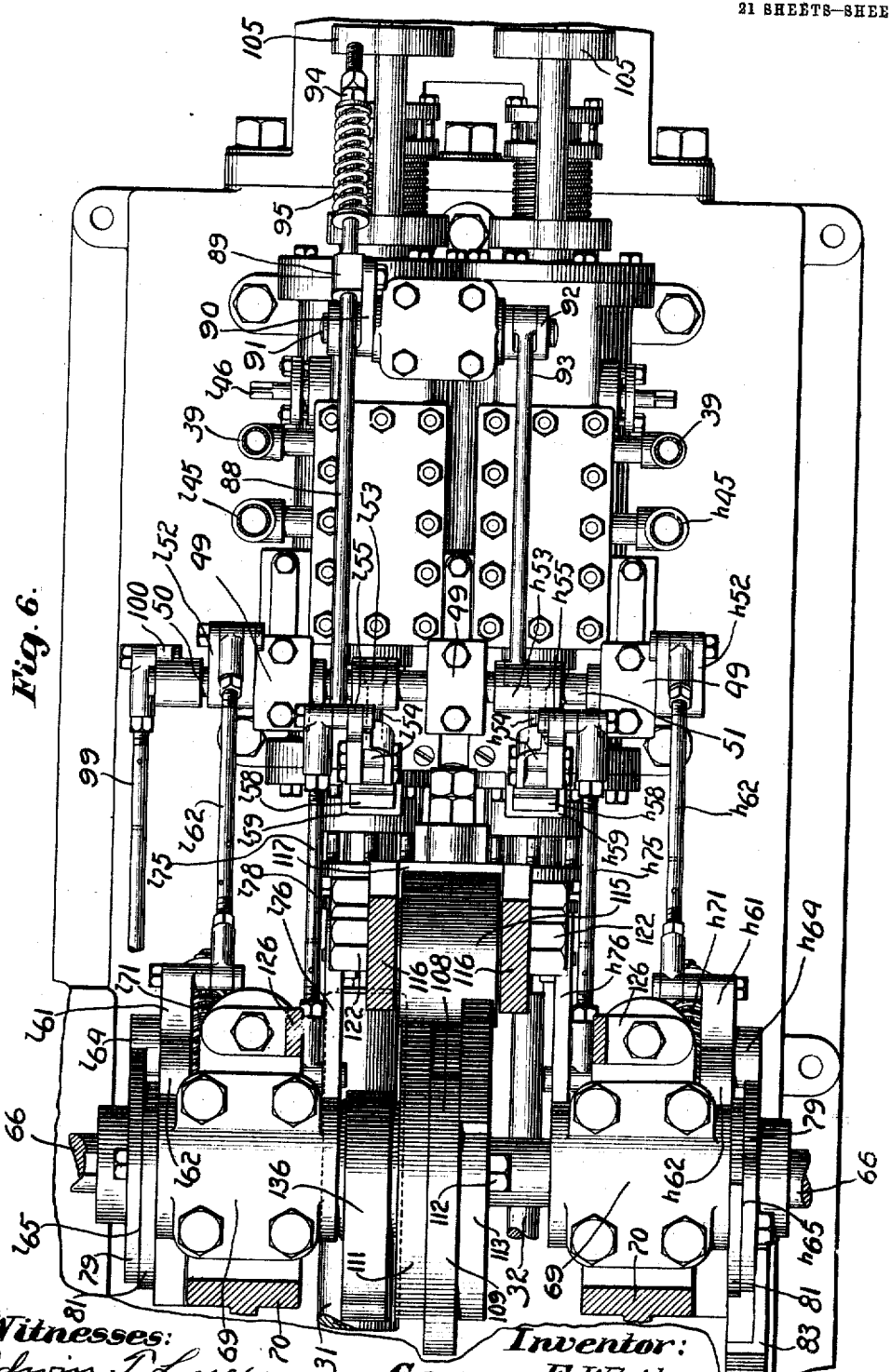

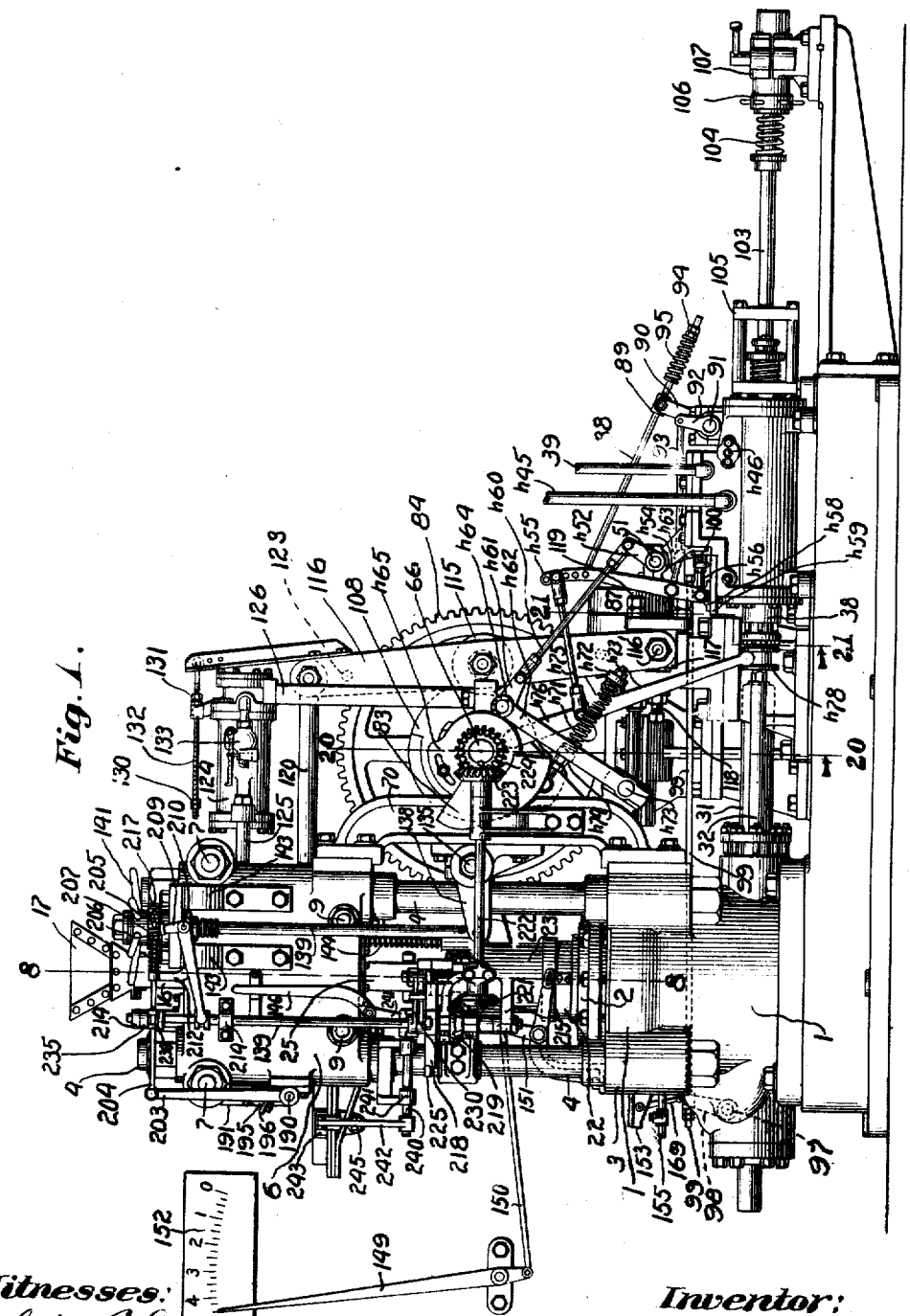

G. E. WHITNEY.
PRESS.
APPLICATION FILED AUG. 12, 1908.
1,003,561.
Patented Sept. 19, 1911.
21 SHEETS—SHEET 2.
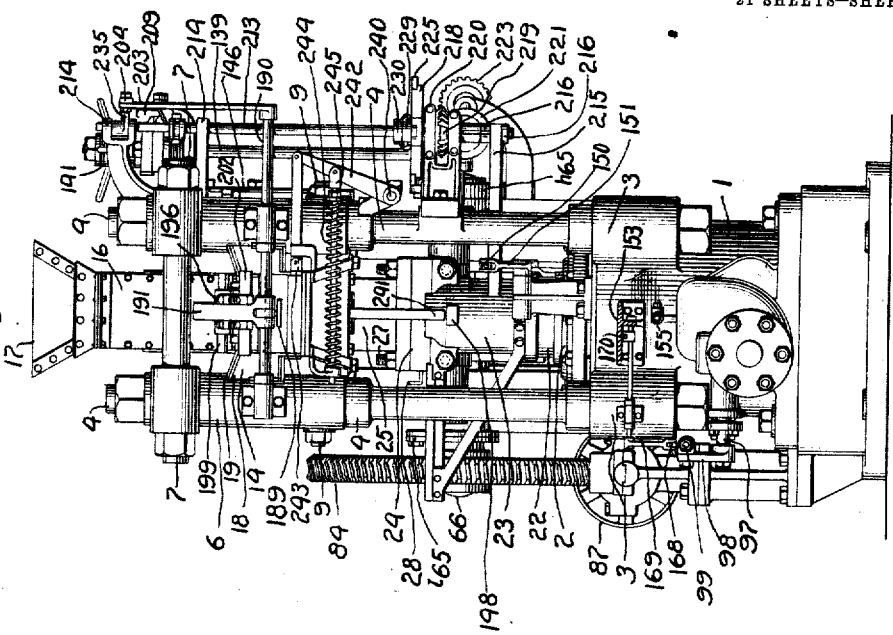
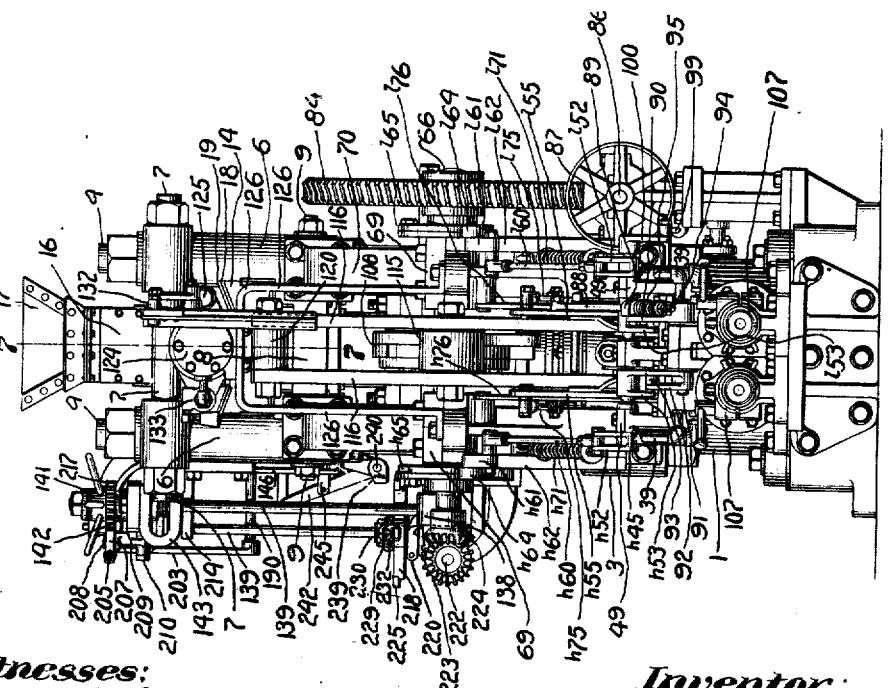
Witnesses:
Edwin P. Luce
Robert H. Kammer.
Inventor:
George E. Whitney,
by Emery and Booth Attys.

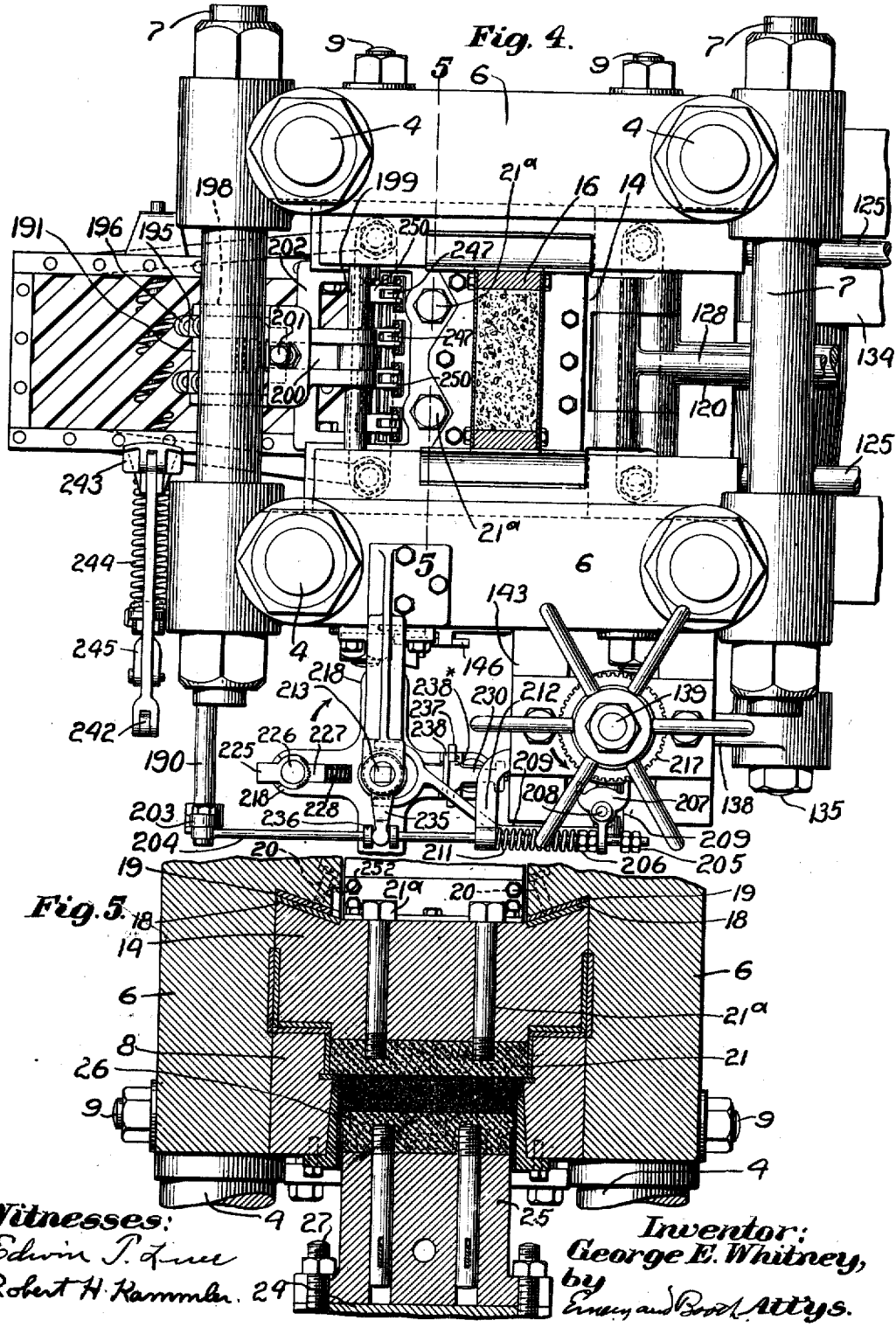

G. E. WHITNEY.
PRESS.
APPLICATION FILED AUG. 12, 1908.

1,003,561.

Patented Sept. 19, 1911.
21 SHEETS—SHEET 4.

Witnesses:
Edwin T. Luce
Robert H. Kammler

Inventor:
George E. Whitney,
by Emery and Booth, Attys.

G. E. WHITNEY.
PRESS.
APPLICATION FILED AUG. 12, 1908.

1,003,561.

Patented Sept. 19, 1911.
21 SHEETS—SHEET 7.

Witnesses:
Edwin T. Luce
Robert H. Kammler

Inventor:
George E. Whitney,
by Emery and Booth, Attys.

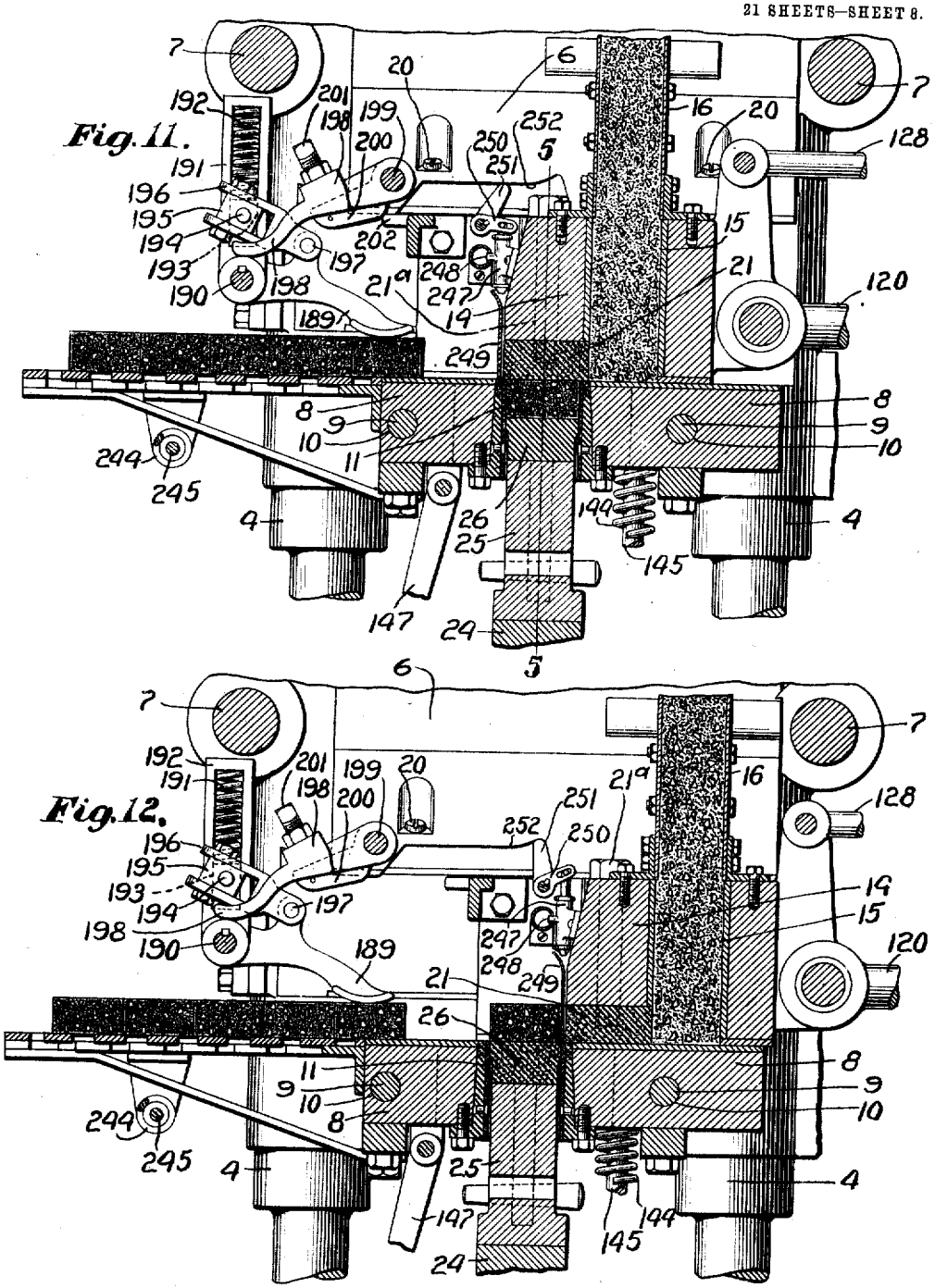

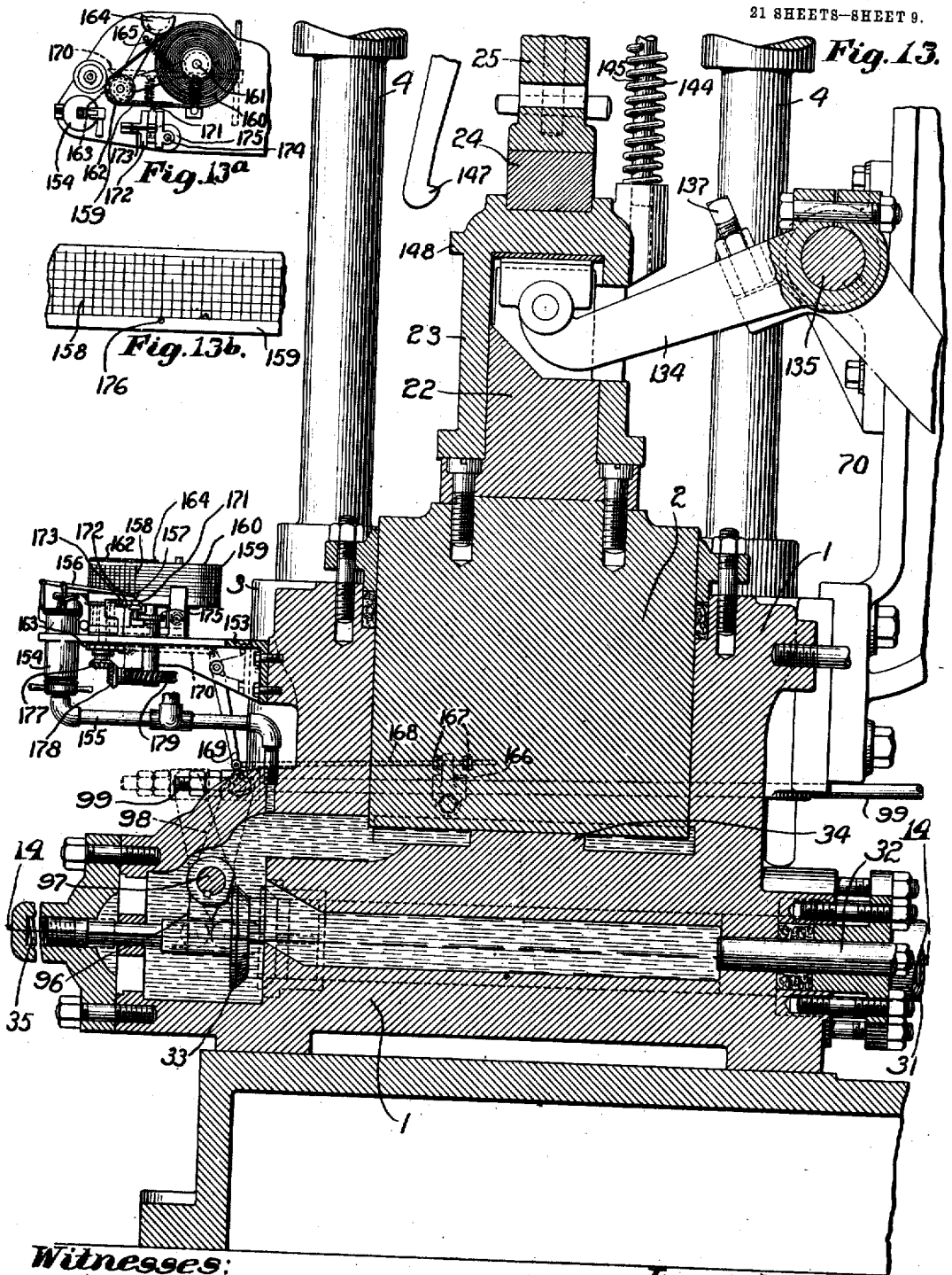

G. E. WHITNEY.
PRESS.
APPLICATION FILED AUG. 12, 1908.

1,003,561.

Patented Sept. 19, 1911.

21 SHEETS—SHEET 10.

Witnesses:
Edwin P. Luce
Robert H. Kammler

Inventor:
George E. Whitney,
by Emery and Booth, Attys.

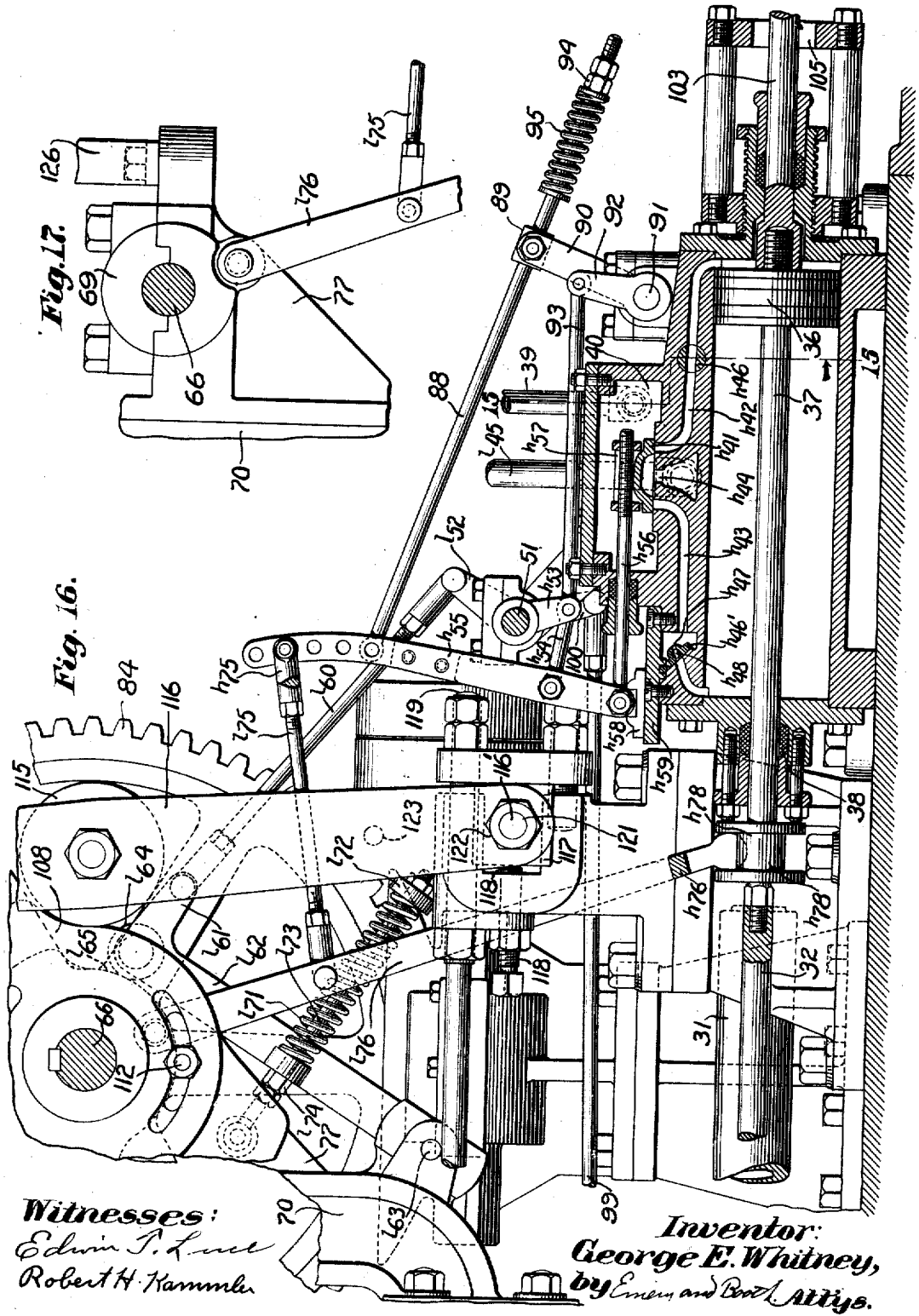

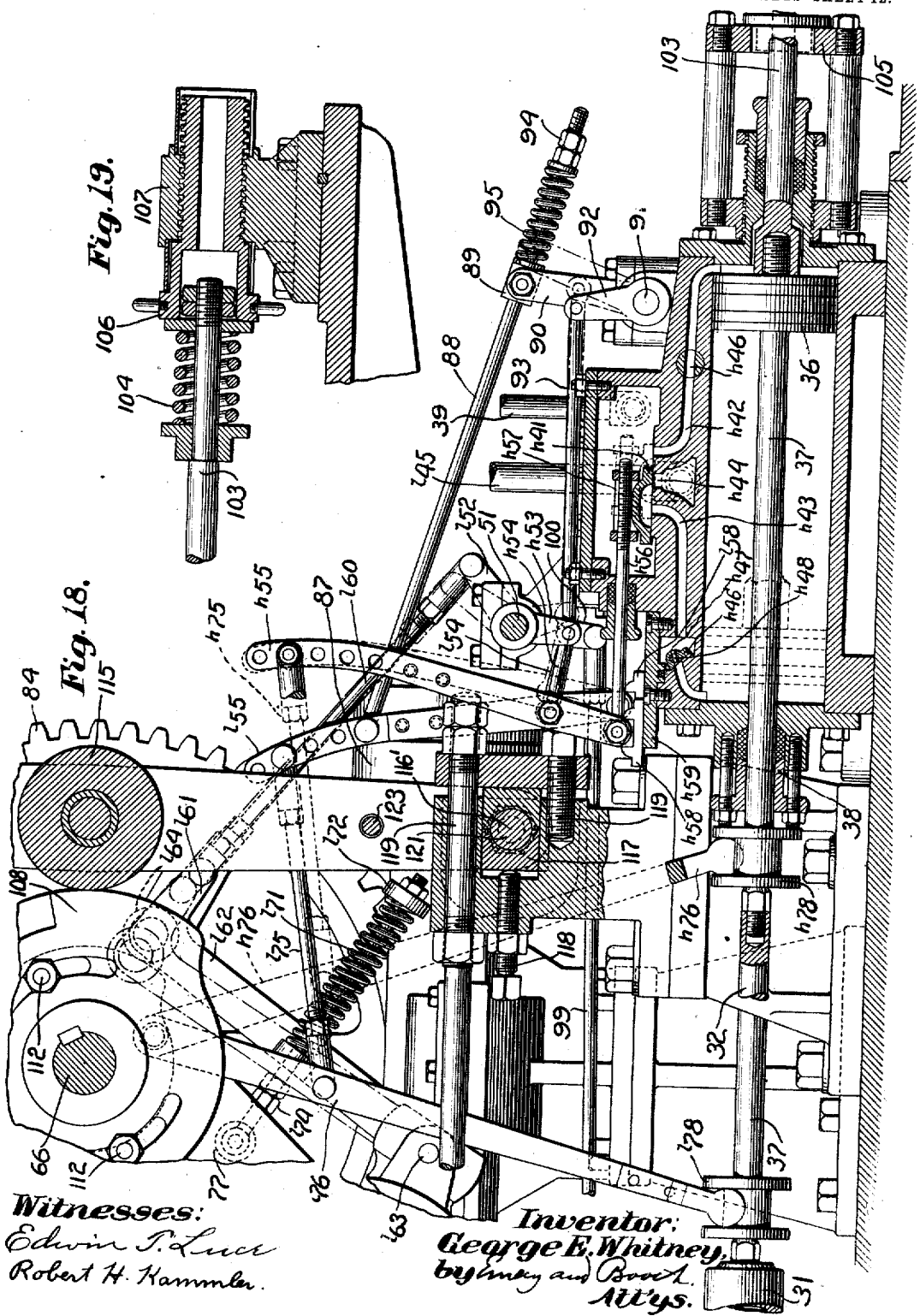

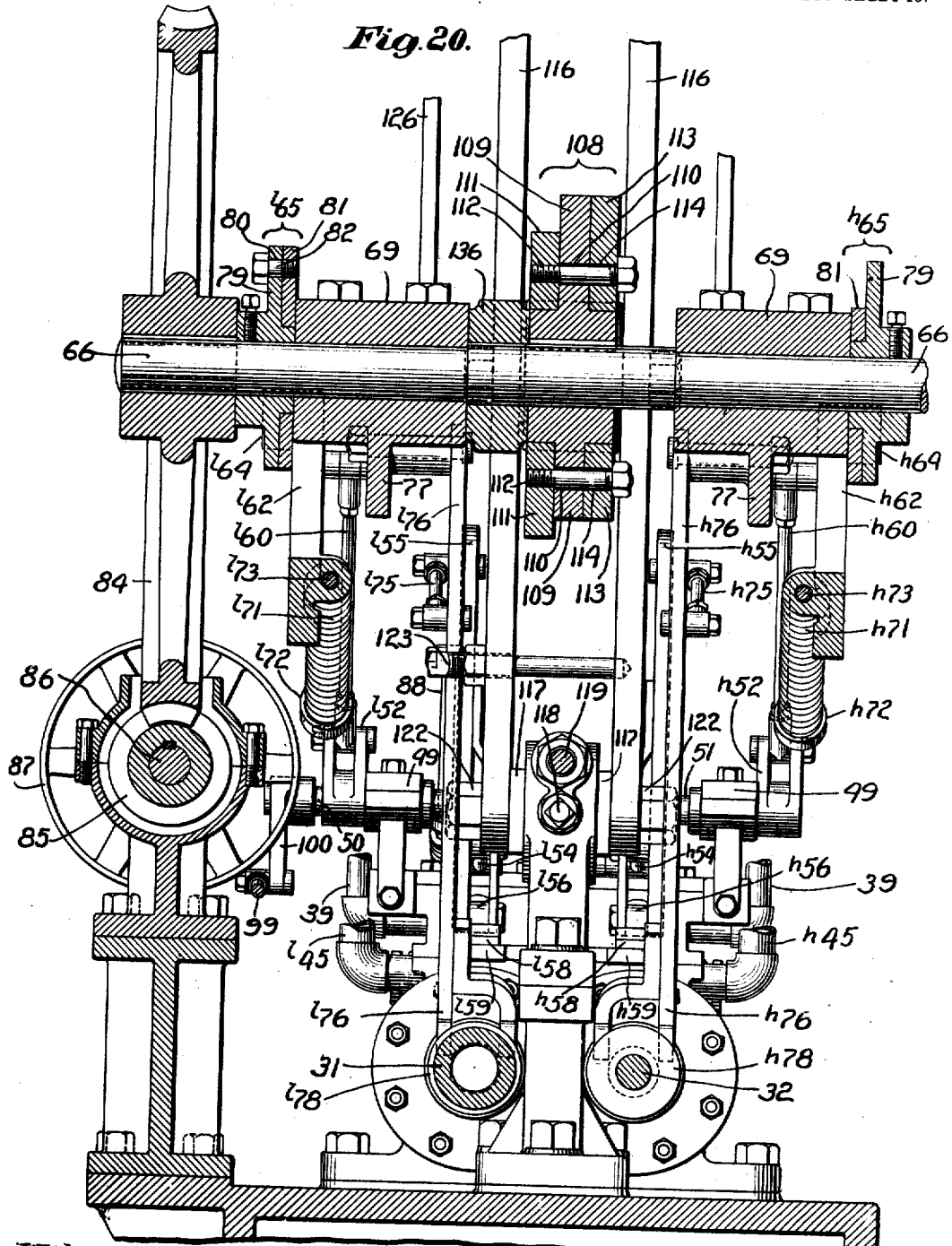

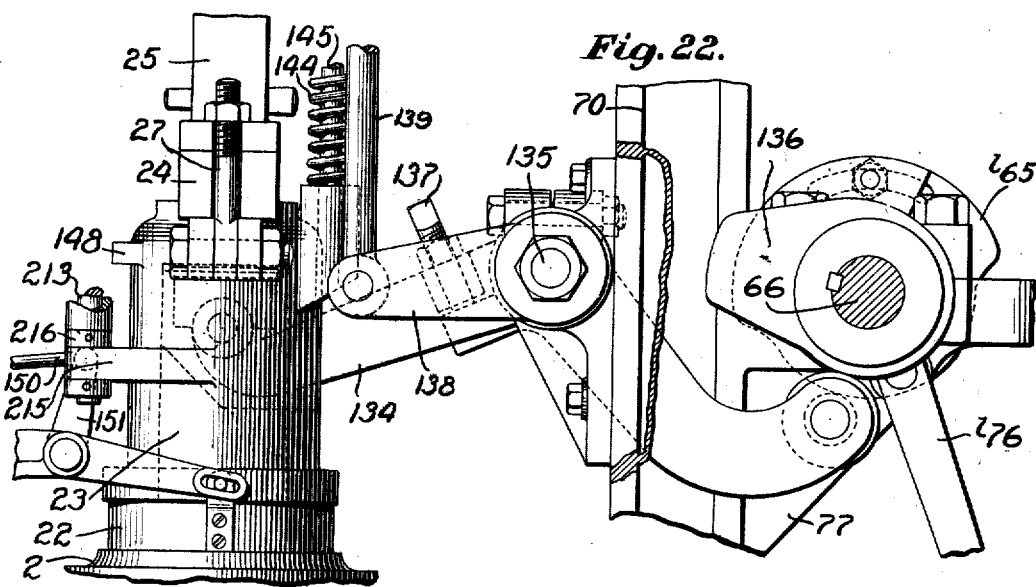
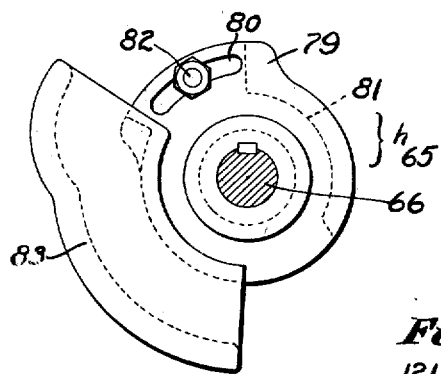
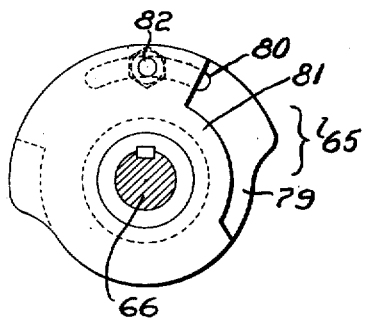
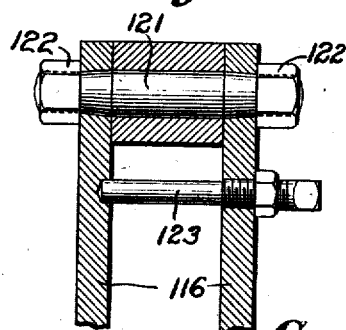

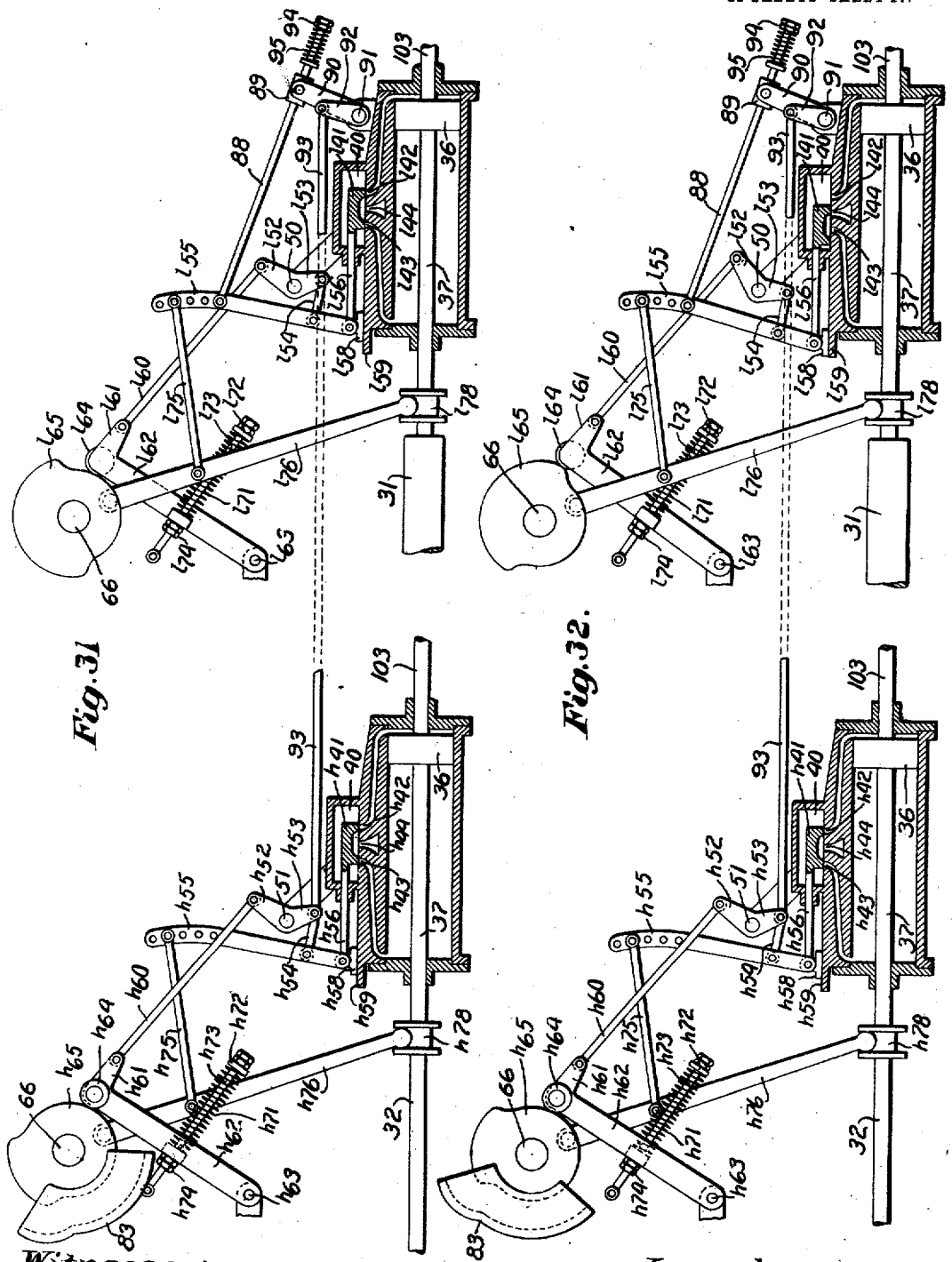

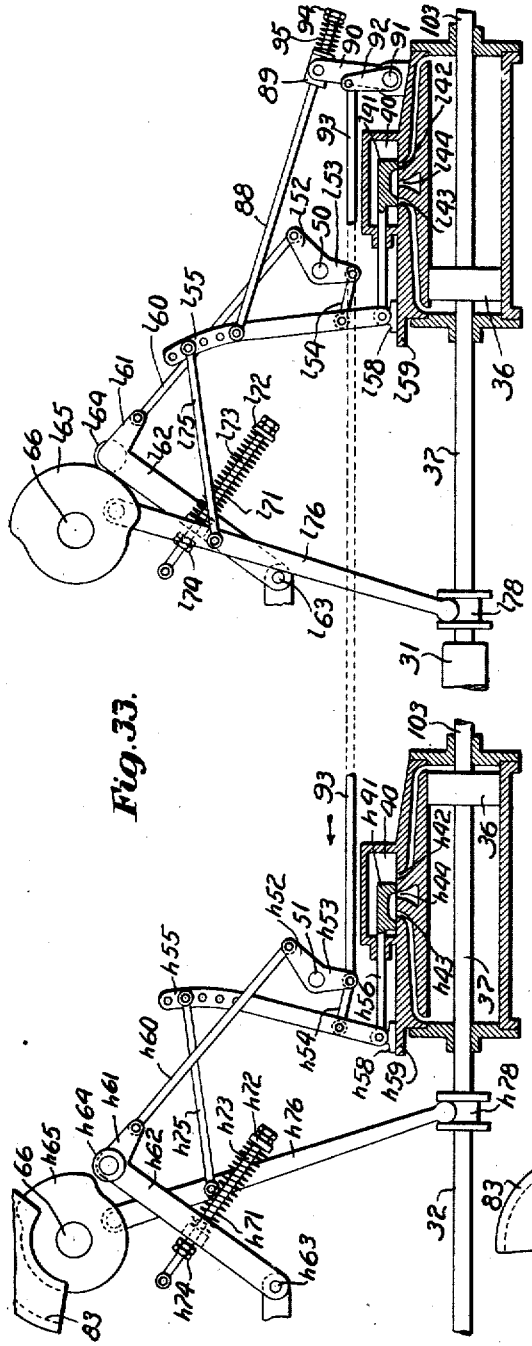
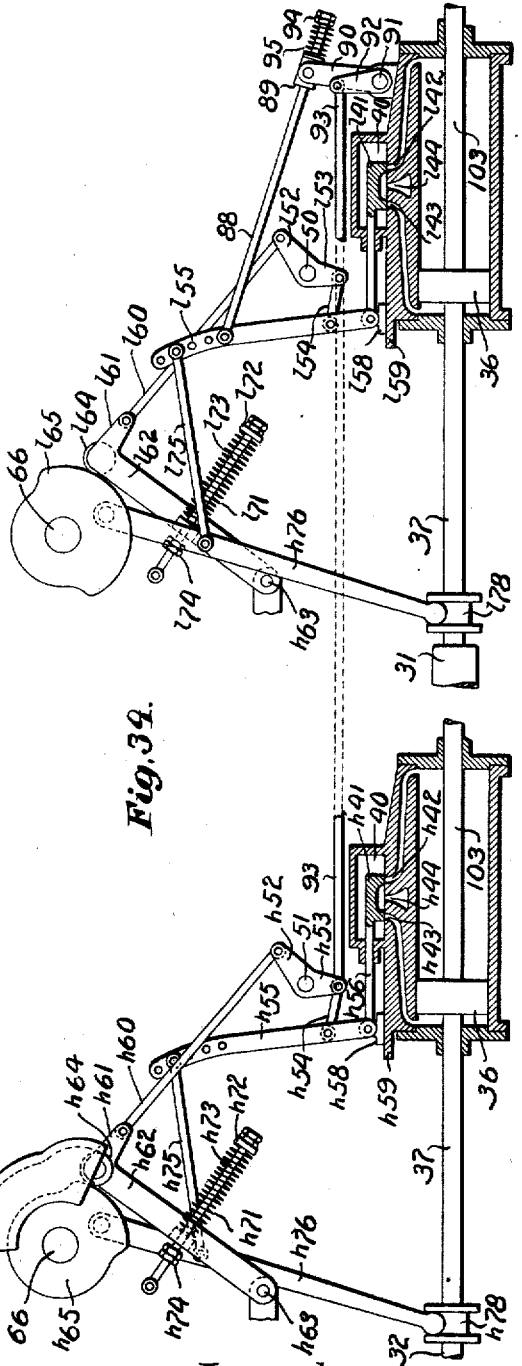

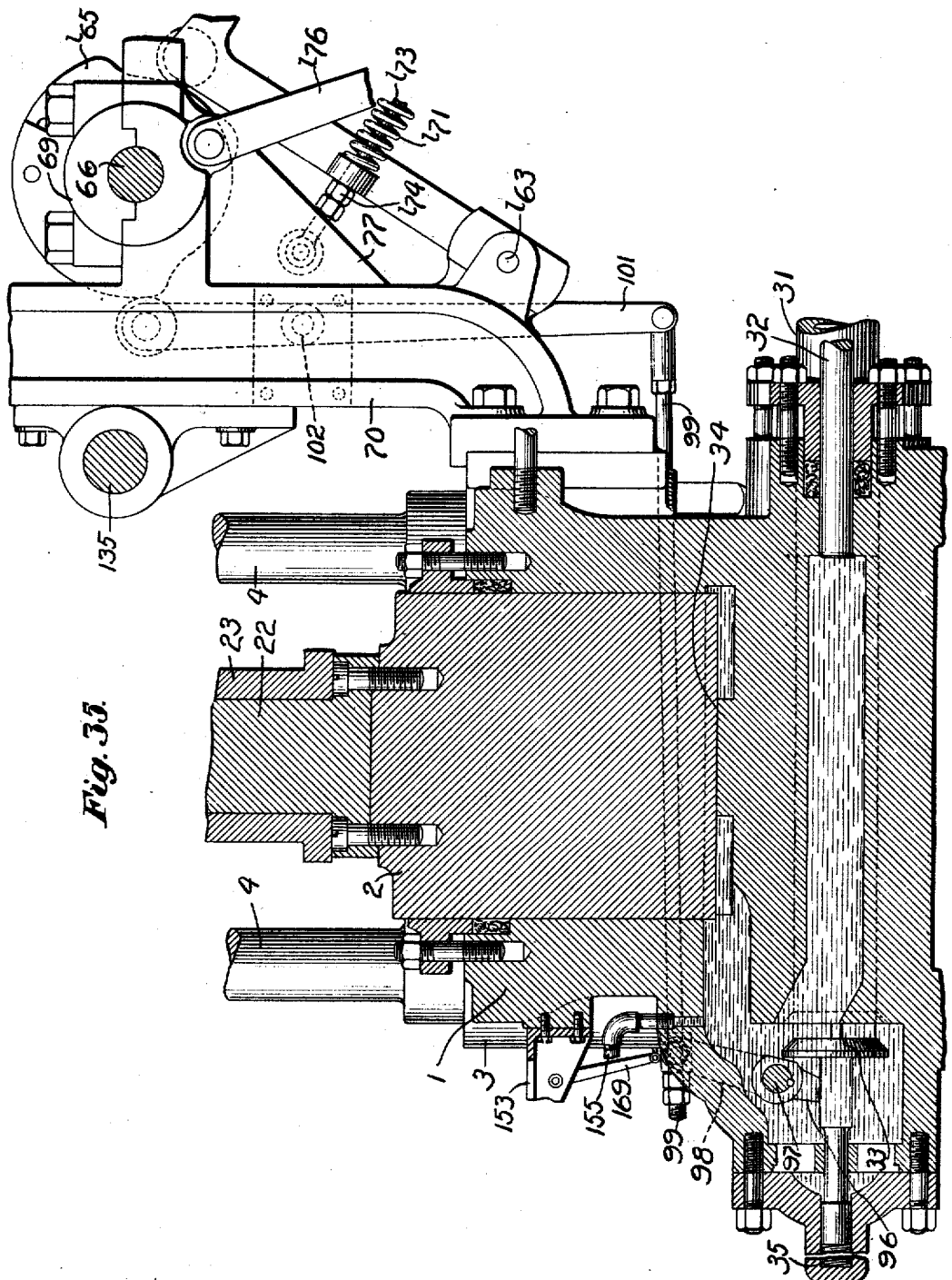

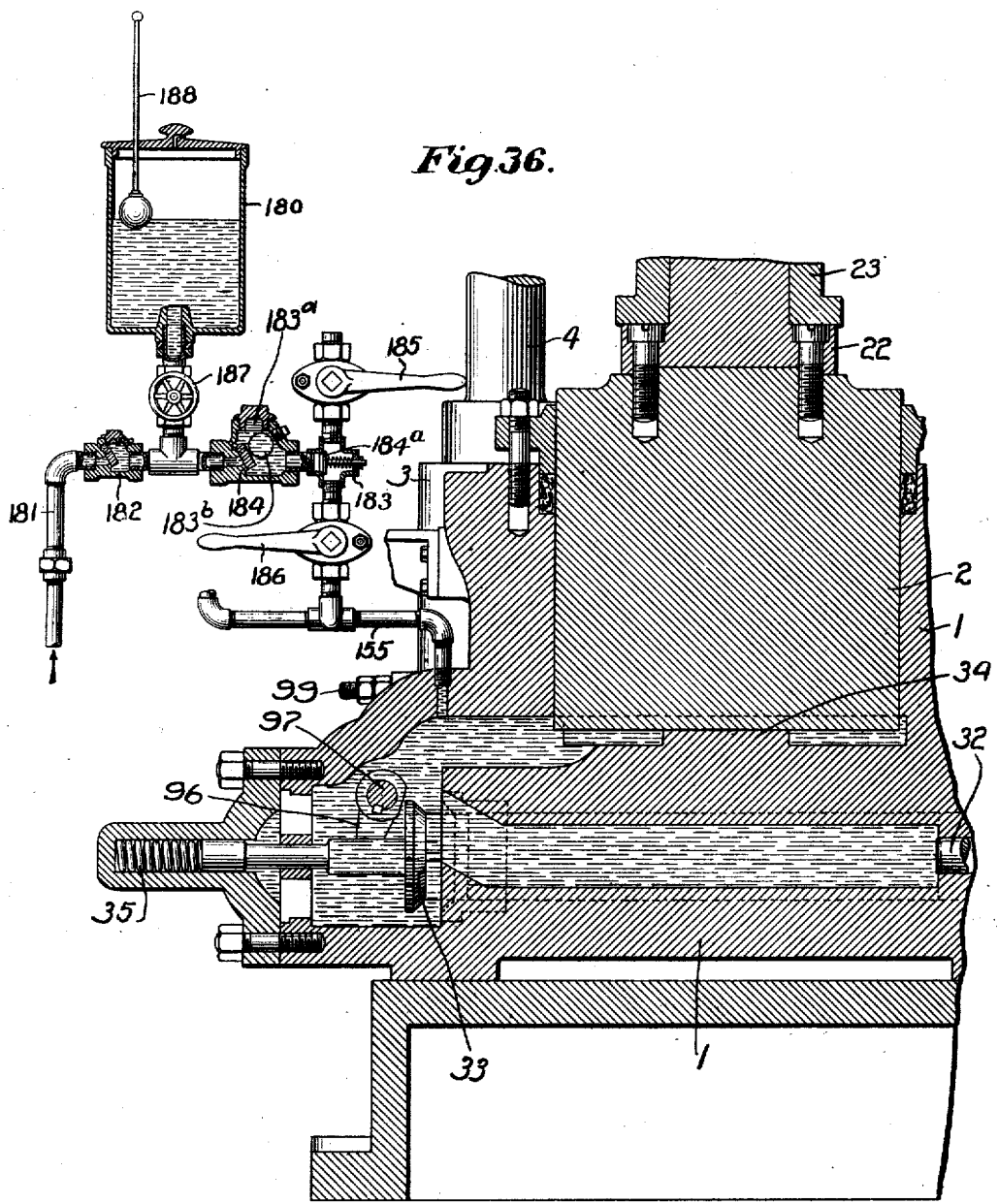

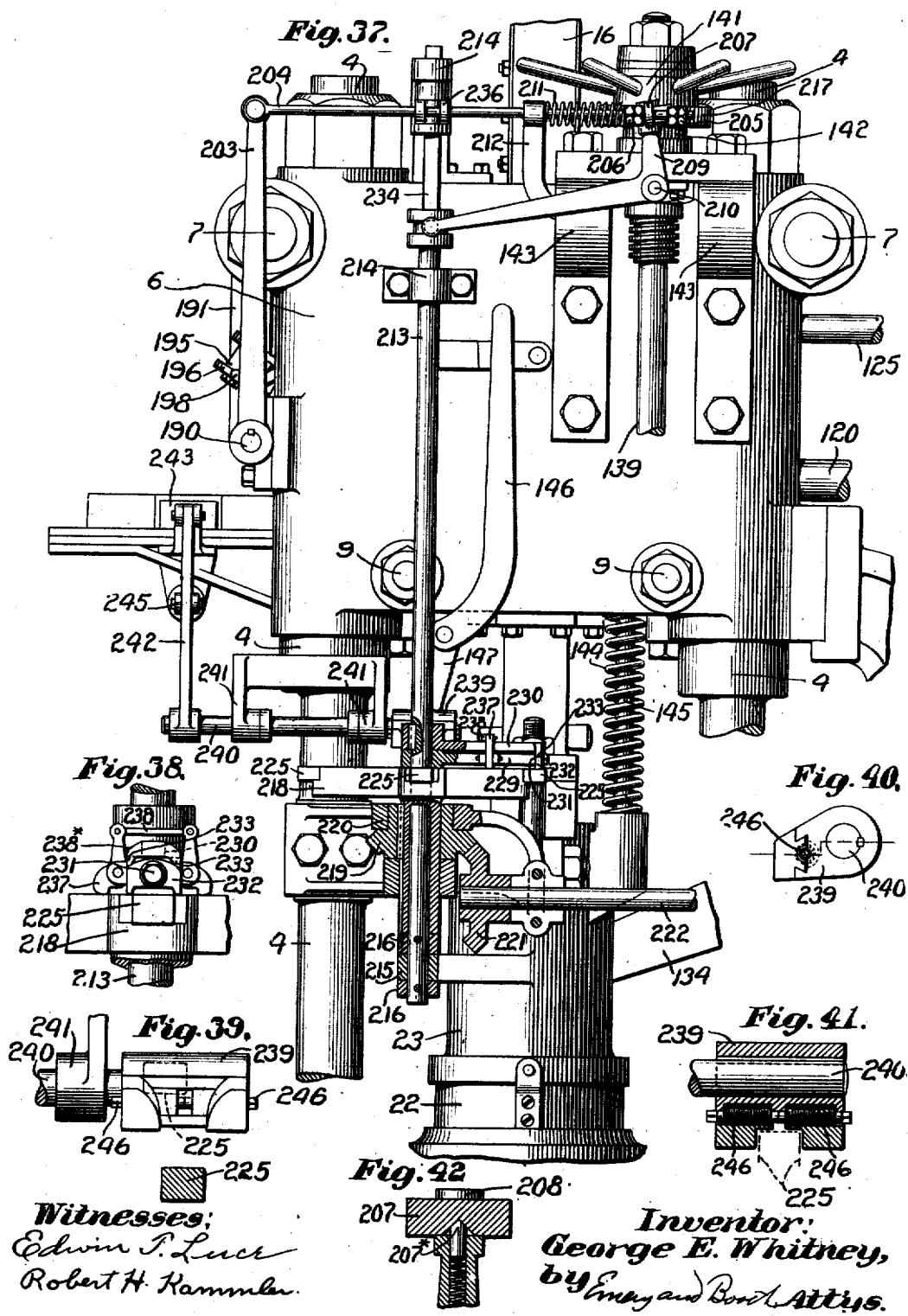

UNITED STATES PATENT OFFICE.

GEORGE E. WHITNEY, OF YONKERS, NEW YORK, ASSIGNOR TO THE INTERNATIONAL PAVEMENT COMPANY, OF HARTFORD, CONNECTICUT, A CORPORATION OF CONNECTICUT.

PRESS.

1,003,561.  Specification of Letters Patent.  Patented Sept. 19, 1911.

Application filed August 12, 1908. Serial No. 448,236.

*To all whom it may concern:*

Be it known that I, GEORGE E. WHITNEY, a citizen of the United States, and a resident of Yonkers, in the county of Westchester and State of New York, have invented an Improvement in Presses, of which the following description, in connection with the accompanying drawings, is a specification, like letters on the drawings representing like parts.

My invention aims to improve the construction and mode of operation of presses or apparatus employed in the manufacture of asphalt or other blocks, tiles and the-like. It is now becoming commercially essential that these blocks, tiles and the like be compressed not only under very high pressure but with great rapidity. To obtain high pressure and high speed in one and the same press, it has heretofore, so far as I am aware, been customary to employ a strictly mechanical press, because of the limitations inevitably accompanying the hydraulic type of press as commonly designed and used, due largely to the impossibility of circulating liquid at a high rate of speed when under high pressure. Mechanical presses, however, are open to serious objections mainly because of frequent breakdowns by reason of the high pressures required and the excessive wear in the bearings due not only to the prevailing stresses but also to the usual prevalence of dust, which interferes with proper lubrication and causes the various bearings to cut and wear excessively. The necessity in a mechanical press for a fixed throw of the pressure-creating members requires the use of relief devices which are seldom if ever efficient and adequate; furthermore, since in such a press all mechanical movements are as a rule connected with the main driving shaft, which is operated with great power in order to produce the requisite high pressure, any obstruction to any of the connected mechanisms causes the entire power of the press to be exerted to overcome it, with resultant frequent breakdowns.

My invention aims to provide a hydraulic type of press which shall be free from the speed restriction feature and other objections heretofore prevailing in presses of this general type, and to provide also a press which shall possess all the advantages of such type as compared with the mechanical press heretofore generally used.

My invention consists in certain novel features of construction and operation and in certain combinations of parts, all of which will be more fully hereinafter set forth, and in connection with the accompanying drawings.

Figure 7:
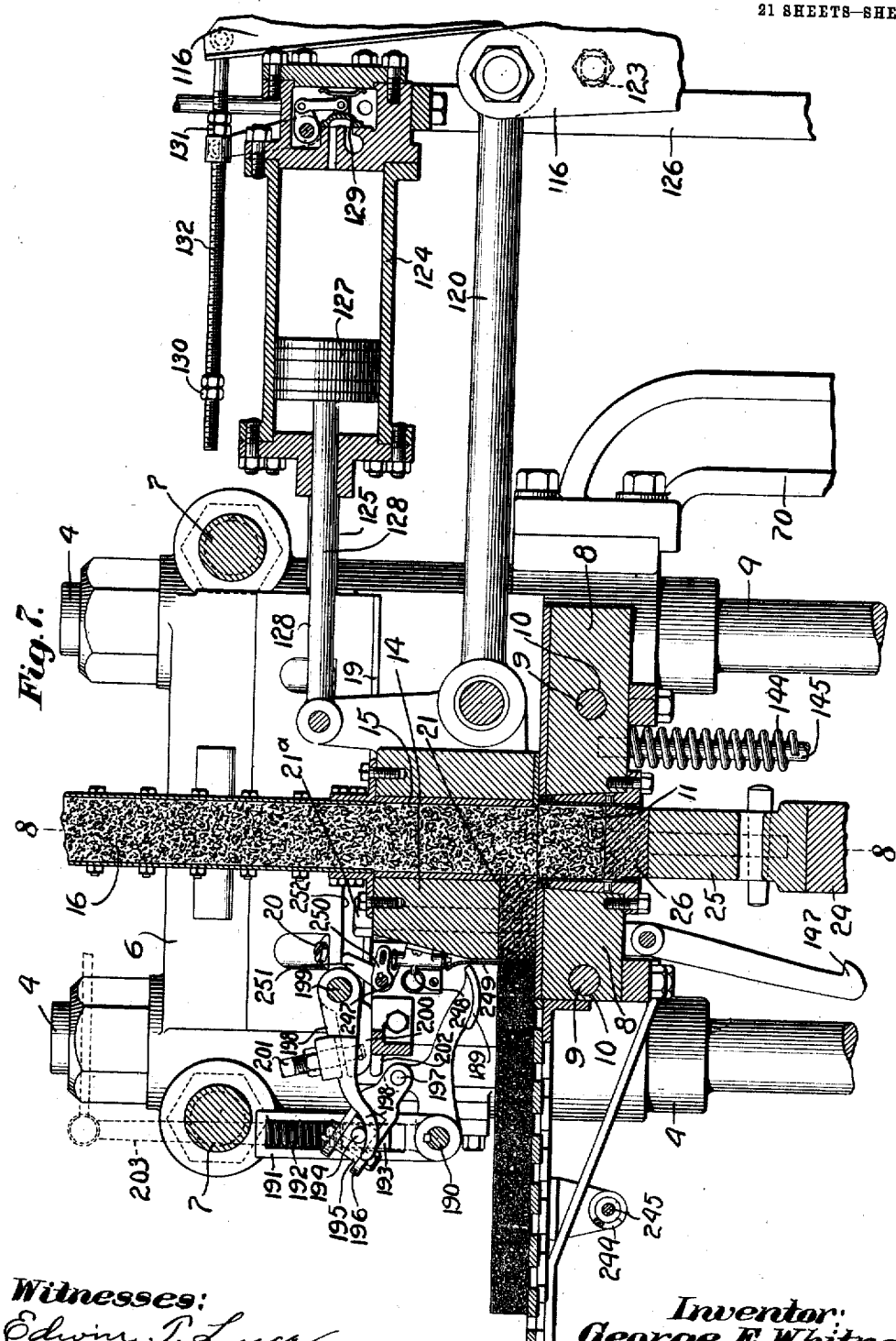
Figure 8:
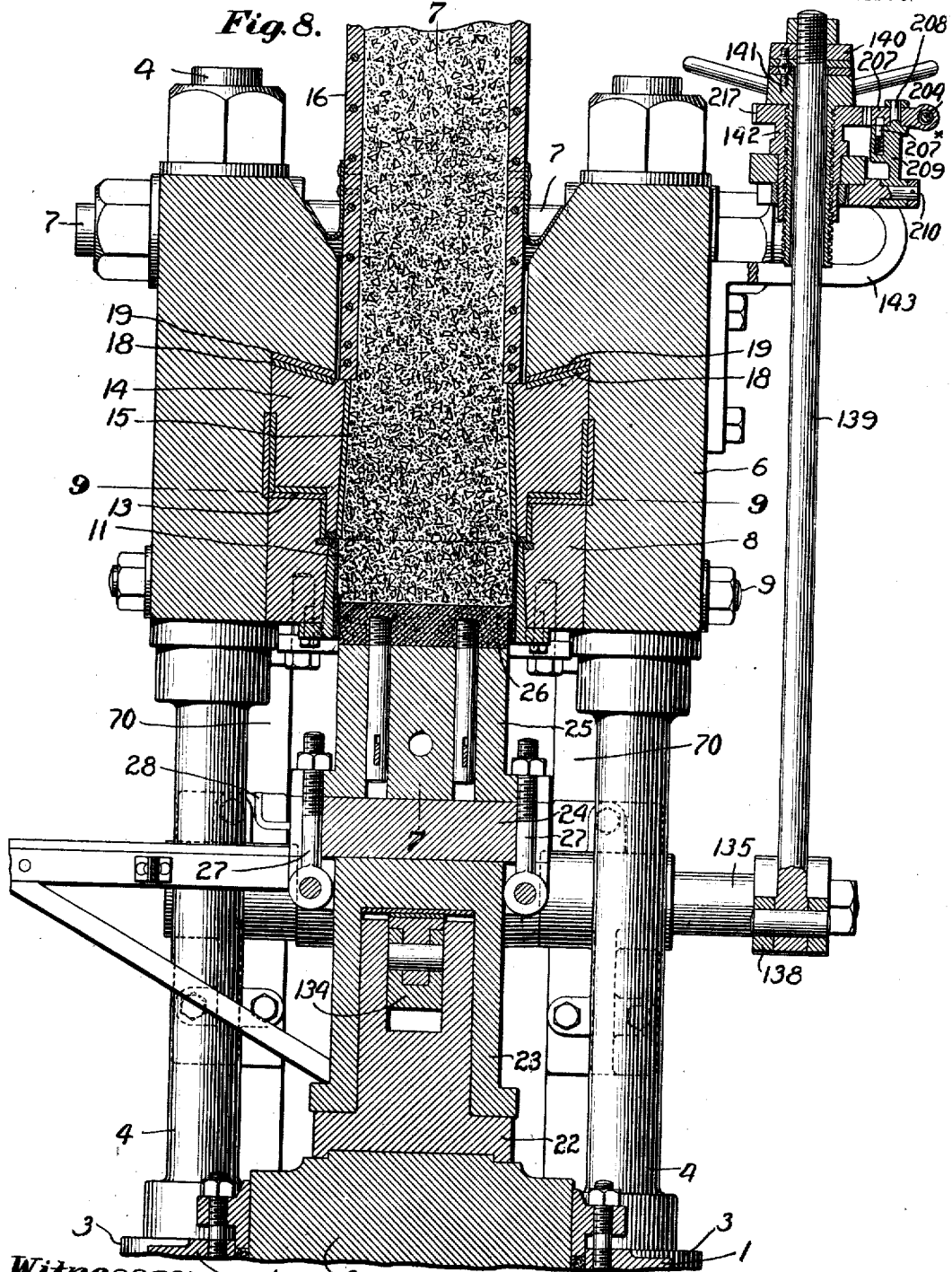
Figure 9:
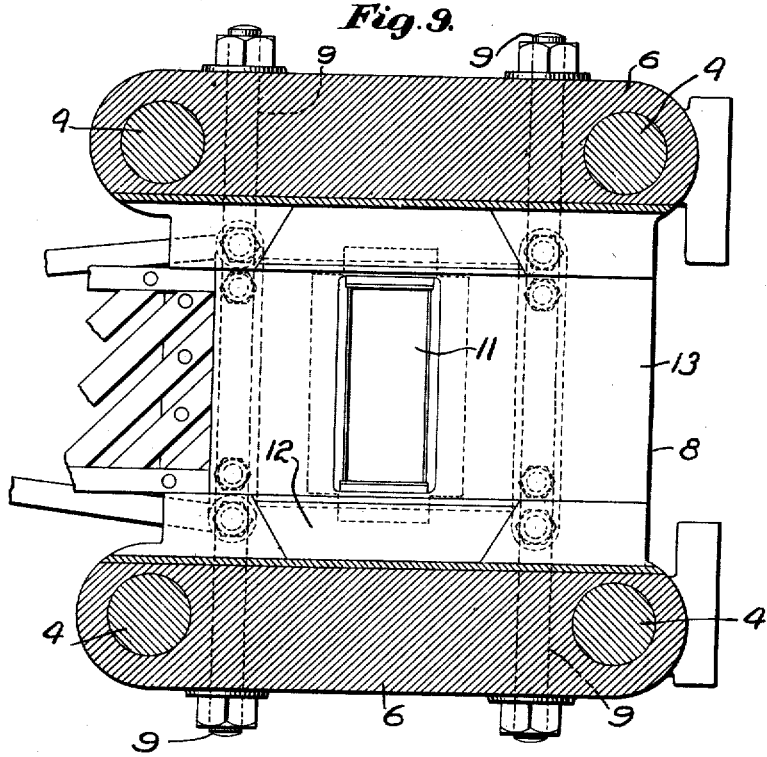
Figure 10:
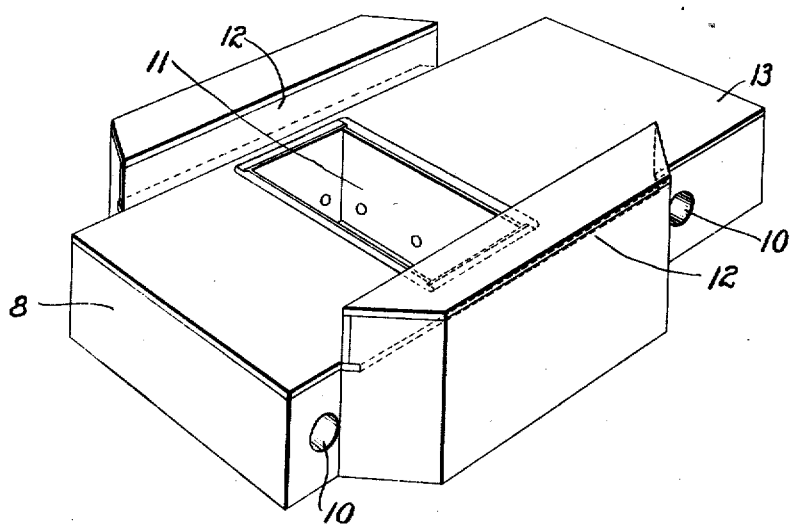
Figure 14:
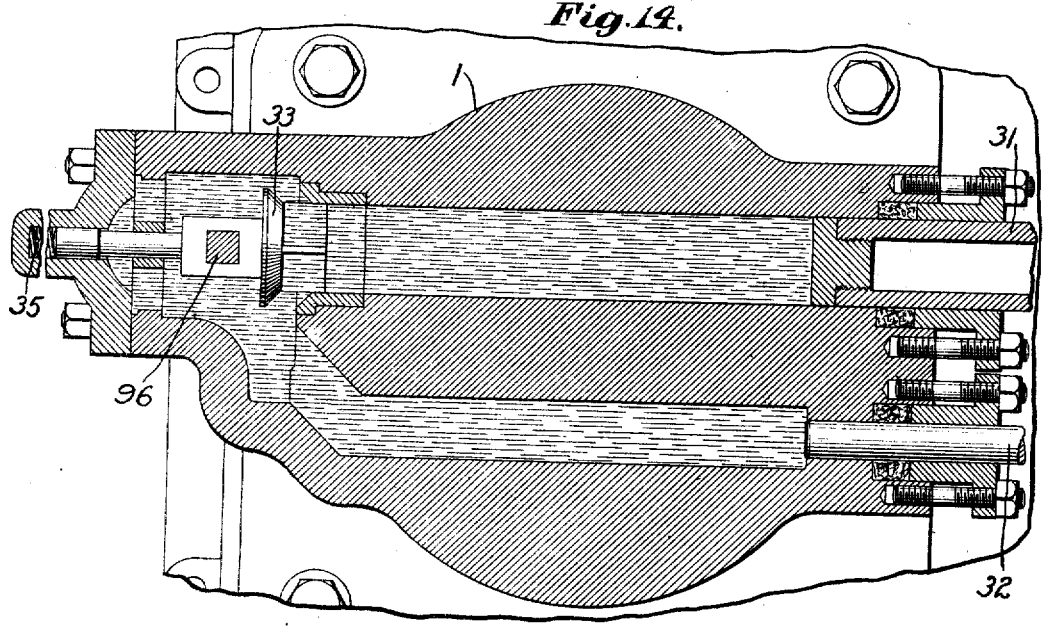
Figure 15:
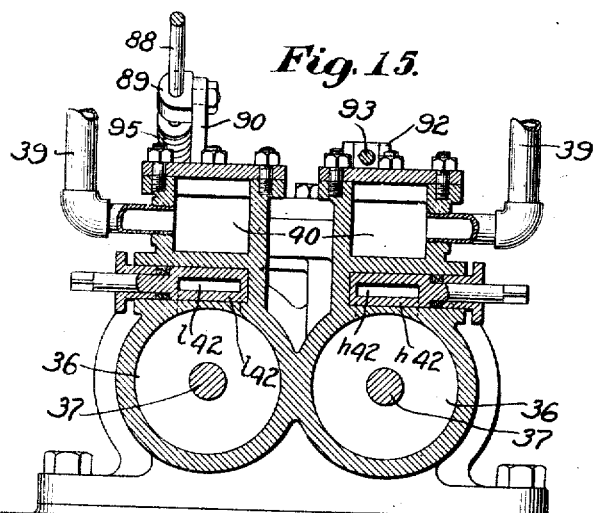
Figure 21:
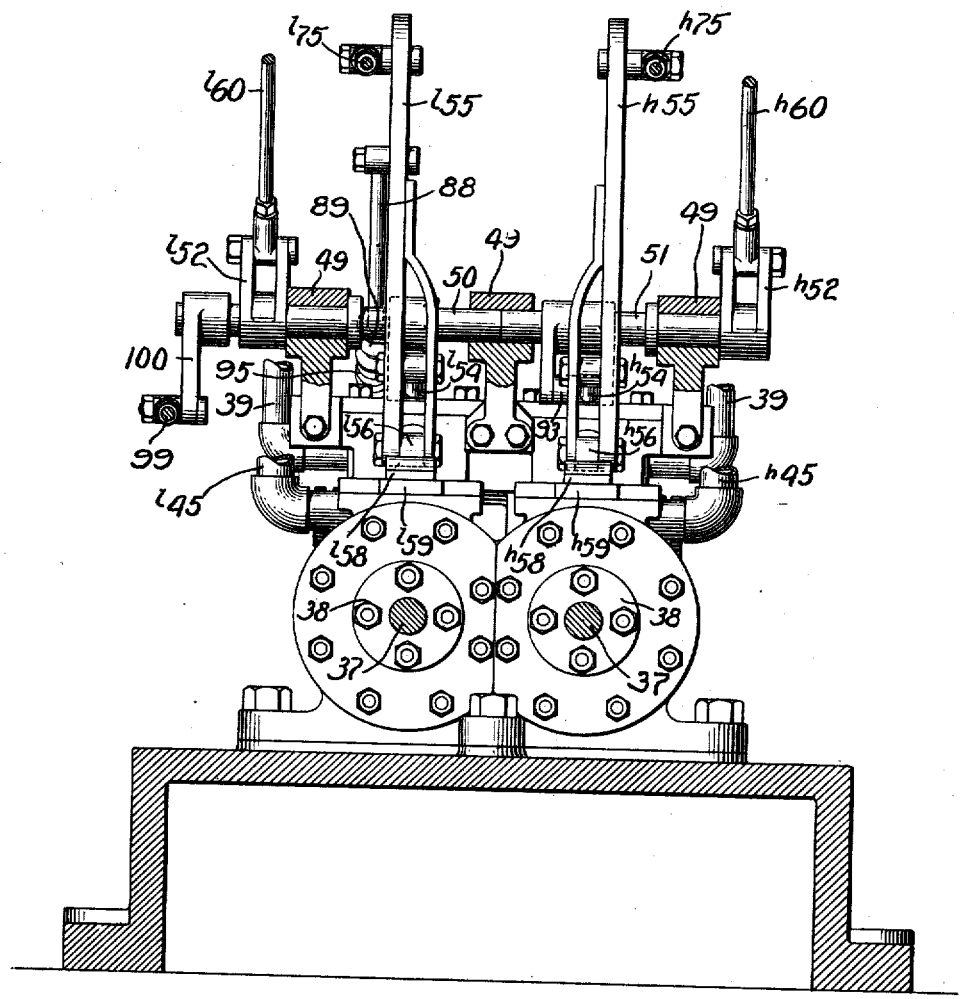
Figure 26:
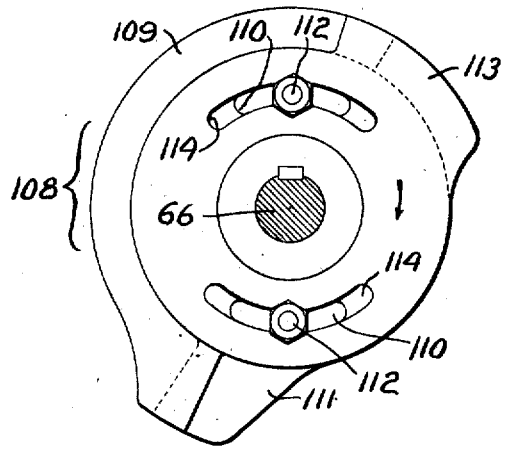
Figure 27:
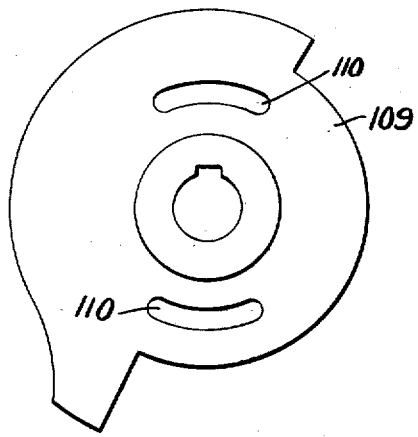
Figure 28:
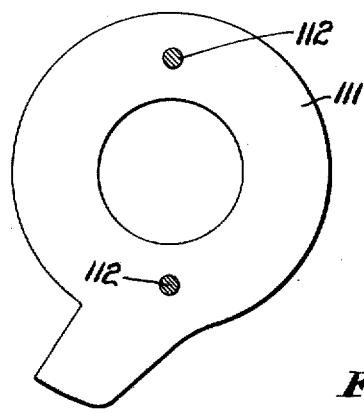
Figure 29:
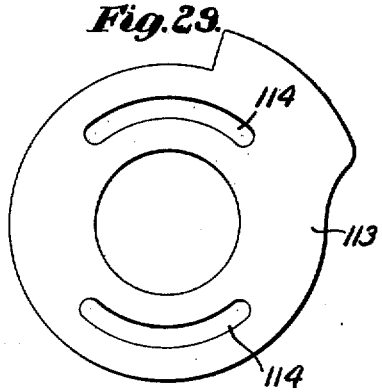
Figure 30:
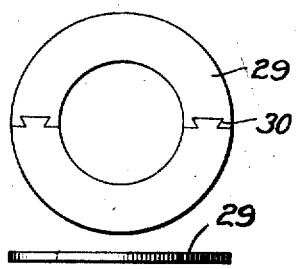

Referring to the drawings,—Figure 1 is a side elevation of an asphaltic block forming press illustrating one embodiment of my invention; Fig. 2 is a rear elevation of such press; Fig. 3 is a front elevation thereof; Fig. 4 is a plan view of the bulkhead of the press, the feeding neck being shown in section; Fig. 5 is a vertical central sectional view taken through the bulkhead, sliding head and plunger upon the line 5—5 of Figs. 4 and 11 and representing the block as compressed; Fig. 6 is a plan view of the high and low pressure cylinders and the parts immediately associated therewith; Fig. 7 is an enlarged vertical section on the dotted line 7—7 of Fig. 8, through the mold block and sliding head, and representing the parts in filling or charging position; Fig. 8 is a vertical longitudinal section on the line 8—8 of Figs. 1 and 7; Fig. 9 is a horizontal section on the line 9—9 of Fig. 8; Fig. 10 is a perspective view of the mold block shown in Fig. 8; Fig. 11 is a view similar to Fig. 7, but representing the parts in compressing position; Fig. 12 is a view similar to Fig. 7, but representing the parts in block ejecting position; Fig 13 is a vertical longitudinal section through the hydraulic block, compressing ram and casing therefor; Figs. 13$^a$ and 13$^b$ are details to be referred to; Fig. 14 is a horizontal section through the cylinder or casing of the hydraulic ram taken on the line 14—14 of Fig. 13; Fig. 15 is a section on the line 15—15 of Fig. 16 looking toward the rear of the press; Fig. 16 is a vertical longitudinal section through the high pressure cylinder and representing in elevation the parts associated therewith; Fig. 17 is a detail showing the mounting for one of the valve cut-off levers; Fig. 18 is a view similar to Fig. 16 but representing the parts differently positioned; Fig. 19 is a detail in vertical section of a buffer mechanism that may be employed in connection with the pistons; Fig. 20 is a vertical transverse section on the line 20-20 of Fig. 1 looking toward the rear of the press; Fig. 21 is a vertical transverse section on the line 21—21 of Fig. 1 looking toward the rear of the press; Fig. 22 is a detail representing in side elevation a portion of the compressing ram, ejecting head and the operating mechanism therefor; Fig. 23 is a detail in transverse section of a portion of the sliding head operating lever; Fig. 24 is a side elevation of the adjustable cam for operating the valve mechanism of the high pressure cylinder; Fig. 25 is a similar view of the adjustable cam for operating the valve mechanism of the low pressure cylinder; Fig. 26 is a side elevation of the adjustable cam for operating the sliding head, showing the parts thereof assembled; Fig. 27 is a side elevation of the central member of the cam shown in Fig. 26; Fig. 28 is a side elevation of the rear member of said cam as the same is viewed in Fig. 26; Fig. 29 is a side elevation of the front member of said cam as the same is viewed in Fig. 26; Fig. 30 is a detail in plan and edge views showing a form of shim employed to regulate the thickness of the blocks or tiles produced by the press; Figs. 31-34, inclusive, are diagrammatic views of the high and low pressure cylinders and pistons and related mechanism illustrating the operation thereof; Fig. 35 is a central vertical section taken through the ram, its cam and associated parts, and representing one means for operating the check valve; Fig. 36 is a central, vertical section taken through the ram and its casing, the latter being partially broken away, and representing means for supplying and maintaining the liquid barrier between the ram and plungers; Fig. 37 is a side elevation, partially in vertical section, and upon an enlarged scale, of the bulkhead and associated parts represented in Fig. 1; and, Figs. 38 to 42, inclusive, are details of portions of the defective block displacing mechanism.

While my invention is of general application, it is particularly adapted for use in compressing what are commonly known as asphaltic paving blocks ordinarily composed mainly of trap rock and a cementitious asphaltic binder, and therefore I have elected to disclose my invention in connection with such use.

The press to be described is provided with a base upon which is positioned, see Figs. 1 and 13, a hydraulic ram cylinder 1, containing the vertically reciprocable ram 2, which compresses the blocks in a mold to be described. Rising from the ram cylinder and bolted in and to ears 3 formed thereon are the columns 4, shown as four in number and to the upper ends whereof is bolted a bulkhead 6 of suitable construction, and herein represented as strengthened by transverse tie bolts 7. Suitably secured in a vertically recessed portion of said bulkhead, is a mold block 8, shown in perspective in Fig. 10, said mold block being held by bolts 9—9 (Figs. 4 and 12) extended through transverse openings 10—10 (see Fig. 10) therein. In the mold block is a mold chamber 11, the opposite lateral walls of which are shown extended vertically as indicated at 12, Figs. 8 and 10, to stiffen the mold block against the compressing action. Mounted for horizontal sliding movement upon the upper face 13 of the mold block and in suitable and preferably under cut guideways formed in the bulkhead is a sliding feeding and pressure receiving head 14 (see Fig. 7) provided with a feeding passage 15, surmounted by a feeding neck 16, at the top of which is a suitable feeding hopper 17, as shown in Fig. 1. If desired the wearing faces of the sliding head and bulkhead may be provided with plates 18, 19. At the proper time in the operation of the press the sliding head is moved into position to cause the feed passage 15 to register with the mold chamber 11 of the mold block (see Fig. 7) to permit the material, fed downward through the neck 16 to enter said mold. In front or to the left of the feed passage the sliding head 14 is provided with a pressure receiving surface, herein represented as formed by a block 21 removably secured to said head, as by bolts 21ª. After the mold has been filled through the feeding passage referred to, the sliding head 14 is slid to the right to the position shown in Fig. 11, to bring the pressure block 21 over and to close the top of the mold, whereupon the ram 2 previously referred to, is elevated to compress the material in the mold, and form the block of desired shape and dimensions. While the said ram may be formed in any suitable manner, I preferably provide it with an ejecting head, which while constituting the effective head of the ram for compressing the block, may nevertheless be lifted away from the ram to eject the compressed blocks from the mold, without necessitating the lifting of the ram as a whole. To this end, the ram (see Figs. 8 and 13) is provided at its upper end with an ejecting head guide 22 having a flange, which supports the ejecting head 23 vertically movable thereon and relative to the ram for ejecting the blocks as stated. Preferably I provide means to permit the parts carried by this head to be abnormally lowered for access to the mold chamber from below. While this may be accomplished in any suitable manner, herein I have mounted upon the upper face of 13 the ejecting head 23 a distance block 24 (Fig. 8) surmounted in turn by the mold plunger 25 which supports the plunger cap 26 that constitutes the bottom of the mold and by which the block is compressed. The mold plunger and the distance block 24 are secured in position on the ejecting head by swing eye bolts 27, the nuts on which may be slackened and the bolts swung off to free said distance block and plunger to permit lowering the plunger clear of the mold to gain access to the mold from beneath. The distance block 24 is provided with a handle 28 by which it may be conveniently withdrawn when necessary.

The thickness of the compressed block may be varied by varying the drop of the ejecting head and the consequent depth of mold and quantity of material permitted to enter the mold. This variation in drop of the ejecting head is provided for by means to be hereinafter described. When the drop of said ejecting head is arrested at such a level with relation to the lowermost position of the ram as to provide an undesirable amount of lost motion between the ram and said head when the former rises to compress the block, I may provide one or more distance rings to be inserted between said ram and the head above it to reduce such lost motion. Such a distance ring is shown separately and marked 29 in Fig. 30 and is adapted to be inserted between the ejecting head 23 and the flange of the ejecting head guide 22 on which it rests while being raised. No change of distance rings is necessary or perhaps desirable except where a substantial change is made in the lowest position of the ejecting head. In lieu of, or in addition to, the use of said distance rings, I may pump additional liquid into the ram chamber in the manner to be hereinafter described.

To displace the oil or other liquid and cause the same to lift the ram, I employ in the present embodiment of my invention one or more, preferably a plurality of displacing plungers, for instance two in number, which for the best results are compounded, the larger plunger being first operated to secure quick movement of the ram through the greater part of its stroke and followed by operation of the smaller plunger to obtain the final movement with the great power required to compress the block to the desired degree.

Referring to Figs. 13 and 14, the larger or low pressure plunger is shown at 31, and the smaller or high pressure plunger at 32, said plungers being reciprocable in the liquid containing chamber formed therefor in the base of said ram cylinder. The low pressure plunger conveniently fills its portion of said chamber to the full diameter thereof so as to receive support for its movement from the wall of said chamber, while the high pressure plunger may be smaller in diameter than its portion of said chamber. In any case where two plungers are used capable of providing different pressures, the two portions of the chamber in which they respectively operate should be capable of being separated temporarily one from the other during the application of the higher pressure to prevent the latter expelling prematurely the lower pressure plunger. In the present instance, this temporary separation is effected by a check valve 33 seated in a portion of the chamber wall and opening away from it at the inner end of the portion of the chamber in which the low pressure plunger operates. When the low pressure plunger is pushed inward this check valve unseats to permit displacement of the fluid from in front of the advancing plunger to cause easy and prompt movement of the ram to preliminarily compress the material in the mold. After the low pressure plunger has completed its stroke, or substantially so, the high pressure plunger is then advanced to produce final movement of the ram and maximum compression of the material in the mold, said check valve 33 at such time closing to prevent this final and high pressure from tending to force the low pressure plunger rearward from said chamber. The ram chamber (see Fig. 13) has a raised central support 34, upon which the ram may rest when in its retracted position, although ordinarily said ram will normally always rest upon, and be supported by, the liquid contained in said chamber.

The check valve 33 may be unassisted in its action, but I prefer to employ a spring 35 to close it. I employ in the present construction shown mechanism for opening said valve at its required time, which mechanism will be later referred to.

By compounding the plungers, as above described, I effect a great saving in the power required to operate the press, the highest pressure and smallest movement being employed only at and near the final movement of the same.

Any suitable means may be employed to produce and control the operation of the low and high pressure plungers and other parts of the press. In the present embodiment of my invention, preferably I employ steam cylinders and pistons therein for the operation of the said plungers. The cylinders (see Figs. 16 and 18) respectively contain pistons 36 on the piston rods 37, the outer ends whereof pass through suitable stuffing boxes 38 and are connected at their forward ends to the displacing plungers 31 and 32. The valve mechanisms for the two steam cylinders may be essentially the same and to avoid repetition I will describe that relating to the cylinder for operating the high pressure plunger, using reference numerals accompanied by the prefix $h$, it being understood that similar reference numerals accompanied by the prefix $l$ refer to corresponding parts of the valve mechanism for the other cylinder operating the low pressure plunger. Steam or any other suitable fluid, from any suitable source, is supplied by pipe 39 to the steam chest 40 of the cylinder wherein is mounted for reciprocatory movement a slide valve $h^{41}$ controlling the steam ports $h^{42}$ and $h^{43}$ leading to opposite ends of said cylinder. The exhaust port is shown at $h^{44}$ and communicates with the exhaust pipe $h^{45}$. The steam port $h^{42}$ leading to the outer end of the cylinder and admitting steam for the inward or compressing stroke of the plunger may be provided with a valve $h^{46}$ of any suitable type to vary the admission of steam through and the resultant stroke of the piston and its connected plunger without requiring any adjustment of the valve mechanism itself. The opposite steam port, at the inner end of the steam cylinder, is shown as provided with a check valve $h^{46'}$ which opens upward to permit free exhaust from the inner end of the cylinder, so as to offer no substantial resistance to the compression stroke of the piston and its plunger. This check valve remains closed against inflowing steam from the valve chest, but it contains a small steam port $h^{47}$ controlled by a plug or other suitable valve $h^{48}$, which permits steam to flow to the inner end of the cylinder to cause return or outward stroke of the piston and plunger but at a rate of speed which will not be excessive because such return stroke is not only practically free from resistance but may in fact be assisted by the fluid under pressure in the ram cylinder.

The valve $h^{41}$ is operated by the following means: Referring to Fig. 21, mounted above the steam cylinders in suitable transverse bearings 49—49—49, are two rockshafts 50, 51, arranged end to end, as shown. Fast on the right-hand rockshaft 51, Fig. 21, are the upwardly and downwardly extended arms $h^{52}$ and $h^{53}$ (see Figs. 1, 16 and 18), the latter being connected by a short connecting rod $h^{54}$ to a vertically disposed floating lever $h^{55}$, the lower end whereof is pivotally connected to a valve rod $h^{56}$. The inner end of said valve rod engages the slide valve 41 for operating said valve in a slot $h^{41}$. The lower end of the floating lever $h^{55}$ is provided with a gib $h^{58}$ which slides on a plate $h^{59}$ to guide the valve stem in a rectilinear line. The upwardly extended arm $h^{52}$ referred to, see Fig. 1, is connected by an adjustable rod $h^{60}$, to an ear $h^{61}$ on a cam lever $h^{62}$, pivotally mounted at $h^{63}$ upon the press frame and provided at its upper end with a cam roller $h^{64}$ adapted to run upon the periphery of a cam $h^{65}$ fast on a transverse shaft 66, see Figs. 20 and 24, mounted in suitable bearings 69, see Fig. 20, on or forming parts of the vertical brackets 70, Fig. 1, connecting the ram cylinder casting with the bulkhead 6 above it.

Any suitable means may be provided to maintain the roller $h^{64}$ in engagement with its cam $h^{65}$. Herein I have provided, see Fig. 1, a spring $h^{71}$ seated at one end against a lug on the side of said cam lever and at its opposite end against a nut $h^{72}$ adjustable on a rod $h^{73}$, extended through the spring and its cam lever and jointed at its inner end to one of the shaft bearings 69. Near its inner end said rod is threaded to receive one or more nuts $h^{74}$, adjustment of which varies the inward position of the cam lever, i. e., whether it shall be permitted always to follow up its cam $h^{65}$ and if not, when it shall be arrested, thus furnishing convenient means for varying the throw of said lever and the resultant travel of the valve.

Adjustably connected to the upper end of the floating lever $h^{55}$, see Fig. 1, is one end of an adjustable connecting rod $h^{75}$, said rod being connected at its opposite end to the depending piston operated lever $h^{76}$ suitably pivoted at its upper end on one of the cam shaft brackets 77, see Fig. 18. The lower end of said lever, see Figs. 1, 16 and 18, is forked to straddle the high pressure piston rod 37 between the flanges of a spool $h^{78}$ fast on said piston rod 37.

The cam $h^{65}$ referred to for operating the valve mechanism of the high-pressure cylinder may be of any suitable type. Preferably, however, and as indicated in Fig. 24, I have provided a two-part cam, one part 79 of which is keyed upon said shaft 66 and is provided with a segmental slot 80. The second part 81 of said cam (see Fig. 20) is secured to the first part by a bolt 82 adjustable in said segmental slot 80, whereby the effective length of the cam faces and the position of the leading edge may be varied at will. The cam as a whole may be a face cam but as here shown it is provided at one side with a track portion 83, the function whereof will be more fully hereinafter stated.

The cam shaft 66 may be rotated in desired manner. I prefer to rotate it by means of a worm wheel 84 thereon, see Figs. 16 and 20, driven by a worm 85 keyed upon a shaft 86 journaled in suitable bearings rising from the bed plate. This worm shaft may be driven from any suitable source of power. Herein said worm shaft is provided with a pulley 87, see Fig. 20, driven from a convenient countershaft, not shown.

Rotation of the cam shaft 66 will cause the high part of the cam $h^{65}$ (Fig. 16) to engage the roller $h^{64}$ on the cam lever $h^{62}$ and throw the latter to the right. This operates through the connecting rod $h^{60}$ to throw the rockshaft 51 and through its depending arm $h^{53}$ and short connecting rod $h^{54}$ throw the lower end of the floating lever $h^{55}$ to the left (Fig. 16), thereby shifting the valve $h^{41}$, as in Fig. 18. This admits steam to the right of the piston to cause the latter to move to the left for the compressive stroke of its plunger. As the piston rod moves to the left, the piston actuated lever $h^{76}$ is swung to the left viewing Fig. 34, thereby, through the connecting rod $h^{76}$, carrying the upper end of the floating lever $h^{55}$ to the left, upon the connection of said lever to the arm $h^{58}$ as a fulcrum. During this movement the rockshaft 51 is held from movement by the spring $h^{71}$ pressing its cam lever $h^{62}$ against the cam $h^{65}$. When the piston rod thus carries the upper moving end of the floating lever $h^{55}$ to the left, the lower end of said lever shifts the valve to the right (Fig. 34) to close the steam port $h^{42}$ and cut off the supply of steam therethrough. When the piston traverse has then operated through the floating lever to shift the valve to close both ports, as in Fig. 34, the ports remain in such position until continued rotation of the cam $h^{65}$ permits return of its cam lever, thereby through its floating lever to shift the valve $h^{41}$ to reverse its position and admit steam to the left of the piston to reverse the travel thereof in its cylinder.

It will be observed that the time of beginning the compression stroke of the low pressure displacing plunger is absolutely determined by the cam $L^{65}$, and that said low pressure plunger by its operation may start the compression stroke of the high pressure displacing plunger, and that the return strokes of both said plungers are also timed by the cam shaft carrying the high and low pressure cams $H^{65}$ and $L^{65}$, so that while the said plungers in performing their work may proceed variably according to condition obtaining for the time being, there is absolute certainty that they will begin and finish their respective strokes within a proper time with reference to the remaining mechanism. Nevertheless when once the plunger begins a stroke in either direction, the floating lever valve motion described acts to arrest the stroke on its completion, whether the stroke has been a quick or a slow one and irrespective of the rotation of the cam. This is important because it often happens that one batch of mixture will compress more quickly than another, or the supply of mixture may fail completely, and the mechanism described prevents the plunger outrunning the valve motion.

As heretofore stated, the parts constituting the valve mechanism for the steam cylinder at the left (Fig. 21) which operate the low pressure plunger are substantially the same as the valve mechanism for the high pressure plunger just described and are referred to by similar reference numerals accompanied however by the prefix $l$. Bearing in mind that these two plungers are employed in what may be called a compounded arrangement and that the larger or low pressure plunger should for the best results always complete its compressive stroke in advance of the smaller or high pressure plunger, it is evident that means should be provided for insuring the correct timing of the two plungers, so that the larger plunger may first enter the ram cylinder to produce preliminary lift of the ram and compression of the block followed by entrance of the high pressure plunger to cause final lift of the ram and final compression of the block and for first withdrawing the high pressure plunger to relieve the pressure within the ram cylinder, so that the check valve may be opened and the larger or low pressure plunger may be properly withdrawn preparatory to a new cycle for the compression of a new block. I have herein provided means whereby the valve stem of the high pressure plunger cylinder may be operated by and near the end of the movement of the floating lever of the valve mechanism of the other or low pressure cylinder if the low pressure plunger finishes its stroke before the high pressure cam comes into operation.

Referring to Figs. 16, 18, and 31 to 34, the floating lever $l^{55}$ has adjustably connected to it one end of a connecting rod 88, the opposite end of which is extended loosely through a knuckle joint 89 pivotally mounted upon an arm 90 fast upon a short rockshaft 91. Also fast upon said short rockshaft is a second arm 92, the upper end whereof is connected by a connecting rod 93 to the depending arm $h^{53}$ of the high pressure plunger valve mechanism. The outer or right hand end of the connecting rod 88 is threaded and receives thereon lock nuts 94 against which is seated a spring 95. When in the compressive stroke of the low pressure plunger, the piston operated lever $l^{76}$ has nearly reached the limit of its movement, it will have drawn with it the upper end of the floating lever $l^{55}$ sufficiently to bring the spring 95 against the arm 90 and will rock the said arm and its rockshaft 91 to cause the second arm 92, through its connecting rod 93, to swing the lower end of the other floating lever $h^{55}$ also to the left to open the valve connected therewith, to start the piston for the high pressure plunger; and it will be observed that this takes place quite irrespective of the cam $h^{65}$, which may or may not have traveled far enough to operate its connecting rod valve mechanism. This is accomplished by mounting the two cams $h^{65}$ and $l^{65}$ on one and the same cam shaft 66, which insures desired timing of the two mechanisms and their respective plungers.

The said cam shaft is, however, independently driven because employed for sliding the sliding head which, as will be hereinafter set forth, should have a driver in no way connected with the compressing means; hence it is desirable to provide means for causing the plungers to be successively operated one by the other, when once the low pressure plunger is set in motion so as to insure completion of the cycle independently of the cam shaft, in the event of the high pressure cam not yet having come into action. To this end, the movement of the upper end of the lever $l^{55}$ to the left, as indicated in Fig. 33, imparts a corresponding axial movement to rod 88. Thus when once the cam shaft has turned sufficiently to cause full stroke of the low pressure plunger, the operation of the high pressure plunger may proceed quite independently of the further rotation of the cam shaft, and the two plungers will operate as stated to compress into a block the material that is in the mold.

To insure the cam roller $h^{64}$ following the drop in its cam $h^{65}$, I have provided the track part 83 of the cam heretofore referred to which engages said roller just before the drop in the cam is reached.

Although in Fig. 18 I have represented the port $h^{42}$ as fully uncovered and the piston 36 as at the rear end of its stroke, it will be understood that this is for illustrative purposes only and that in practice both the high and low pressure inlet ports $h^{42}$ and $l^{42}$ may be and usually are but partially uncovered at such time.

The concordant action of the two valve mechanisms controlling the low and high pressure plungers, respectively, is well illustrated in the diagrammatic figures, 31 to 34, inclusive. In Fig. 31 the low pressure plunger and its operating means are shown at the right of the drawing and the high pressure plunger at the left of the drawing. It will be observed that the valves for the steam cylinders of both plungers are in position closing the parts thereof, so that the plungers will remain at rest. When in the operation of the press the cam $l^{65}$ reaches and engages the roller on the cam lever $l^{62}$ it will shift the floating lever $l^{55}$ (as in Fig. 32), to shift the valve and start the low pressure plunger on its inward, compressing movement. As the plunger moves inwardly it takes with it the piston operated lever $l^{76}$, causing the latter through the connecting rod $l^{75}$ gradually to swing the floating lever so as to close the valve (as in Fig. 33) when it has completed its full stroke, provided the compression of the material in the mold permits of the full stroke of the plunger. Just before the floating lever has been completely shifted to arrest the compressing movement of the low pressure plunger, the spring on the end of the rod 88 engages the knuckle joint 89 on the arm 90 (see Fig. 33) and, if the cam shaft has not in the meantime turned sufficiently to cause the cam $h^{65}$ to start, the high pressure plunger, will through the rock shaft 91 and second arm 92 and the connecting rod 93 (see Fig. 33) operate to shift the floating lever $h^{55}$, to move the valve controlling the high pressure plunger to admit steam to its cylinder (as at the left, Fig. 33), to start the said high pressure plunger upon its compression stroke. When this stroke has been completed, provided the material will sufficiently compress to permit of a completed stroke, the swinging of the lever $h^{76}$ will cause the floating lever $h^{55}$ to be moved to close the valve (as at the left in Fig. 34). Both plungers have now completed their inward or compression movements, and they remain in their most inward positions with the valves covering the steam ports of their operating cylinders until, in the further rotation of said cam shaft 66, the pathway 83 on the cam $h^{65}$ (see Fig. 34, at the left) engages the cam roller on the lever $h^{62}$ and pulls said lever down to the low part of the cam, thereby to reverse the position of the valve $h^{41}$ and cause the piston controlling the high pressure plunger to be retracted from the ram cylinder. Soon after it has embarked upon its retraction movement the check valve 33 is opened, as heretofore described, preparatory to the retraction of the low pressure plunger, which is started shortly after the beginning of the retraction of the high pressure plunger by the cam $l^{65}$ on the cam shaft. When the two plungers have been fully retracted the floating levers $h^{55}$ and $l^{55}$ operate automatically to shift the steam valves to cover both ports to the respective steam cylinders, thereby leaving said plungers in their retracted positions until such time in the further operation of the press as the cam shaft shall, in its rotation, cause the valve mechanism to operate as heretofore described for a new cycle.

It will now be clear how the compression movement of the low pressure plunger and the retraction of the high and low pressure plungers are timed by the cams on the cam shaft, so that it is impossible for the plungers to operate at any but the correct times, thus making it possible in a press of this sort to time the operation of fluid-pressure-actuated plungers with parts coöperating therewith, which are mechanically operated and timed, and which cannot for the best results be operated by fluid pressure nor positively connected with the pressure creating power.

As previously stated, and as represented in Figs. 13 and 14, a check valve 33 is positioned intermediate the ram and the low pressure plunger, said check valve being closed during the compressive movement of the high pressure plunger. While any suitable means may be provided to control this check valve, I have here provided means permitting the valve to close at the proper time, but positively opening the same prior to the rearward or non-compressive stroke of the low pressure piston. To effect these results, the stem of the check valve (see Fig. 13) is pocketed at its upper side to receive the rounded end of the depending arm 96 on a rock-shaft 97 mounted in the ram cylinder casting. This rock-shaft extends to the outside of said casting where it carries an upright arm 98. To the upright arm is connected by means furnishing a lost motion, a rod 99 which reaches forward and to the right (see Figs. 16, 18) and is connected at its remote end with an arm 100 depending from the short rock shaft 50 (Fig. 21). Thus when said rock shaft is moved it will cause the check valve referred to to be removed from its seat in anticipation of the retraction of the low pressure plunger upon the further movement of said rockshaft. In Fig. 35, I have shown a different means for controlling the check valve. Here the rod 99 is connected to the lower end of an upright lever 101 fulcrumed at 102 and acted upon at its upper end by the cam 7⁸⁵.

In the embodiment of my invention herein shown, the compressive and return strokes of the high and low pressure pistons are effectively controlled by the valve mechanism therefor. If desired, however, I may provide buffer or stroke limiting mechanism to prevent any excess stroke of said piston or pistons in either direction. For this purpose, I have represented the high and low pressure pistons as provided with tail rods, that for the high pressure piston being most clearly indicated at 103 in Figs. 1, 16, 18 and 19. Each of the tail rods is fitted with a buffer spring 104 (Fig. 19), adapted on the inward or compressive stroke of the plunger to bring up against a yoke-like buffer 105, supported by the cylinder head and on the return stroke to bring up against a buffer sleeve 106, adjustably held in a split bracket 107 on the press bed.

The sliding head 14 may be operated in any desired manner. Preferably I effect the rearward movements thereof by suitable cam mechanism upon the shaft 66, and the forward or opposite movement of the head by suitable fluid pressure or equivalent mechanism. While any suitable cam mechanism may be provided, I preferably and as represented in Figs. 26 to 29 inclusive, provide the cam shaft 66, heretofore referred to, with a cam 108 (Fig. 6) composed of a central member 109 (Fig. 27) keyed thereon and provided with circumferential slots 110. Upon the left hand side of said central cam member looking rearwardly of the press in Fig. 20 and seated upon the hub of said member is positioned a cam member 111 (see Fig. 28), it having studs 112 secured therein which extend through said circumferential slots 110. Upon the opposite face of the central cam member is a third cam member 113 (see Fig. 29) having slots 114 which also receive said studs, nuts on said studs furnishing means for clamping said cam members together in relatively adjustable position, to constitute in effect a single cam, the parts of which are circumferentially adjustable. This cam acts upon a roller 115 journaled in a vertical lever 116 fulcrumed at 116′ on an adjustable journal 117 mounted in a suitable bracket on the frame. At one side this journal is sustained by an adjusting set screw 118 and at its opposite side by the clamping studs 119 by which said block and the position of the lever fulcrum may be adjusted at will. The upper end of the lever 116 is jointed to a connecting rod 120, the opposite end whereof is suitably jointed to the rear of the sliding head 14, previously referred to and as shown in Fig. 7. The time of commencement and termination of the movements of the sliding head may be altered by the adjustment of the cam 108. Adjustment of the fulcrum of said lever 116 will, however, alter the position occupied by the sliding head not only at the commencement but at all other parts of the cycle of movements thereof, as, for example, to effect an accurate alinement of the charging opening 15 therein with the mold chamber 11, and this, too, during the running of the press. The parts of the lever 116 (see Fig. 23) are separably united by taper ended studs 121, and nuts 122 thereon, which permit for disassembling the lever for removal of the cam roller or other purposes when necessary. To facilitate actual separation of the lever parts when the nuts are loosened, I have provided the set screws 123. While any suitable means may be employed to maintain the roll 115 of the lever 116 in contact with the cam 108 and to move said sliding head toward the front of the press, preferably I employ fluid actuated means to accomplish this result. To this end, see Figs. 1 and 7, I provide a steam cylinder 124 secured at its front end by studs 125 reaching to the bulkhead and resting at its rear end upon supports 126. This cylinder contains a piston 127, the piston rod 128 whereof is suitably connected to the sliding head. Said cylinder (see Fig. 7) is provided with a suitable valve 129 operated in convenient manner, and herein by lappet nuts 130, 131 on the rod 132 connected with and to be operated by an extension of the cam lever 116 (see Fig. 1).

The construction is such that steam being admitted to the cylinder 124 will force the sliding head forward or inward as fast as the cam roller 115 in contact with the cam 108 will admit. Just before the head reaches its extreme inward position the tappet nuts 131 will shift the valve to place the cylinder in connection with the exhaust (see Fig. 7) but the latter is controlled by a back pressure or relief valve 133 (Fig. 1). The result is that as the cam 108 through the lever 116, draws the sliding head rearward or outward, the steam in the cylinder 124 retains the head constantly under the control of said cam, the relief valve 133 referred to retaining in the cylinder only the necessary predetermined pressure. Just before reaching the limit of outward movement of said head, the tappet nuts 130 reverse the valve and again admit live steam to the cylinder 124 to cause the piston therein to slide the head inward, still under control of said cam.

Assuming the sliding head to be in the position Fig. 7 with the feeding passage 15 thereof in register with the mold chamber 11 and the ram depressed to the predetermined extent, the mold chamber is filled from above as indicated. Operation of the press will now act through the cam 108 to draw the sliding head rearward to cut off the supply of material and to bring the pressure block 21 into position above and constituting the top of the mold as shown in Fig. 11, continued rotation of the cam shaft, which operates as hereinbefore described, causing the plungers to be forced into the ram cylinder, the low pressure plunger first operating to lift the ram for the preliminary compression of the contents of the mold against said pressure block, the high pressure plunger following and imparting final compression thereto, as shown in Fig. 11. The block having been compressed, and ready for removal, continued rotation of said cam shaft causes the cam still further to withdraw the sliding head to its position (Fig. 12), leaving the mold uncovered with the compressed block therein. The ejecting head is now lifted by means to be presently described, to lift or eject the compressed block from the mold into position indicated in Fig. 12, where it stands in front of the sliding head and in a line clearing the top of the mold block. By the time the block has been ejected from the mold, as in Fig. 12, the valve controlling the steam cylinder 124 has been operated to admit live steam to said cylinder to cause the piston therein under control of said cam 108 to reverse the travel of said sliding head and cause the same to advance toward and to its original mold filling position (Fig. 7), pushing the ejected compressed block before it, as shown in said figure. When it reaches its advanced position, the mold is again presented for filling and the cycle is repeated as before. Thus each advance of the sliding head to uncover the mold for feeding pushes the last compressed block before it over upon the table or runway along which it may travel to the usual cooling tank, not shown.

The block ejecting means may be of any suitable type. Preferably, however, I provide, as indicated in Fig. 13, an ejecting lever 134, fulcrumed at 135 in the frame and having one end underlying the ejecting head 23, so that when said lever is rocked it will lift said ejecting head and its cap away from the top of the ram, thereby to eject the compressed block without requiring the entire ram to be raised. This ejecting lever is operated herein by a cam 136 (Fig. 22) on the cam shaft 66 referred to. Said ejector is herein shown as a two part lever, the parts being relatively adjustable at the fulcrum by means of the screw 137 for the purpose of adjusting the upward limit of the ejecting stroke of the ejecting head.

To limit the drop of the plunger cap and parts carried thereon, so as to control the amount of material delivered into the mold chamber and thereby to control the size of the compressed block, preferably I vary the drop of that arm of the ejecting lever which underlies and supports the said cap. Referring to Fig. 22, the fulcrum shaft 135 for said lever and to which said arm is affixed, is provided with a second arm 138, jointed, to which is a vertical rod 139, the upper threaded end whereof (see Figs. 1 and 8) is provided with stop nuts 140. Below the stop nuts is a stop wheel 141, the threaded hub of which depends through a correspondingly threaded sleeve nut 142 mounted in bearings in or carried by the preferably slightly resilient brackets 143. Rotation of said wheel will vary its level and therefore will vary the level at which the stop nuts 140, the rod 139 on which they are mounted, and the ram cap will be arrested in its descent. The operative standing by the wheel 141 may therefore adjust the mold depth from time to time, which may be necessary to vary the quantity of material admitted to the mold so as to obtain blocks of uniform or desired size, notwithstanding any variation in the composition or condition of the material. In the normal operation of the press the rod 139 is lifted through the wheel 141 at each elevation of the inner ejector lever arm and drops under the weight thereof and of the ram cap until arrested by said stop nuts 140. To insure the drop of the ejecting head I have provided coil springs 144, Fig. 13, interposed between the bulkhead and said cap and surrounding the depending rods 145 on the bulkhead.

If desired, means may be provided for retaining the ejecting head elevated temporarily to permit access to the parts. Herein for the purpose I have in Figs. 1, 13 and 37 represented the hand lever 146 fulcrumed upon the bulkhead within convenient reach of the operative and having a hooked lower end 147 adapted to engage the under face of a lug 148 projecting from the ejecting head 23 when the same is elevated during the ejection of the block.

Preferably I provide means visibly to indicate the thickness of the compressed block. While this result may be effected in any desired manner, I have in Fig. 1 represented a sweep arm 149 pivoted upon any convenient support and connected by a rod 150 with a bell crank lever 151, one arm whereof rests on the ram, so as to cause said arm to be moved by and to measure the stroke of the ram and the consequent thickness of the block. The upper end of the sweep arm is adapted to move across the face of a scale 152 herein represented as graduated to represent inches and fractions thereof.

If desired, I may provide mechanism to record the pressure to which each block is subjected in the formation thereof. I contemplate the production of a record strip which may be delivered with each lot of blocks, showing the pressure to which each was subjected. It is apparent that this result may be variously accomplished. Herein for the purpose I have provided mechanism shown most clearly in Figs. 13, 13$^a$ and 13$^b$. Referring to Fig. 13, upon a suitable bracket 153 secured to the ram cylinder 1 is mounted a vertical cylinder 154 in fluid communication, as by pipe 155, with the fluid chamber of said ram cylinder. In said vertical cylinder is a piston, the piston rod whereof is suitably connected to a lever 156 supported at one end upon the cylinder, the opposite end thereof being provided with a suitable marker 157, adapted to mark lines 158 upon a strip 159, the length of each line indicating the amount of pressure imparted to that block formed during the marking of such line. The strip 159 may be supported and fed in any desired manner. Herein, I have represented the said strip as supplied from a roll 160 loosely carried upon a stud 161 mounted in any convenient manner. Adjacent the roll 160 is a feed roll 162 having thereon a ratchet 163 and about which the strip passes from the roll 160 to a receiving roll 164 held in constant peripheral and driving engagement with the roll 160 by a spring 165. The feed roll 162 may be intermittently actuated by a portion of the mechanism having a single movement in one direction for each cycle of movements resulting in the formation of a block. For that purpose I have, in Fig. 13, represented the rod 99 as having fast thereon a lug 166 adapted to contact alternately with tappet nuts 167 upon a link 168 pinned to a lever 169 mounted in any suitable manner and hinged to a pawl 170 engaging the ratchet 163 and turning the same one tooth upon the formation of each block.

Preferably I provide means for indicating upon the strip the completion of a series of blocks. While this result may be variously accomplished, I herein contemplate perforating the strip upon the formation of say every thousandth block. Herein, for the purpose, I have indicated in Figs. 13 and 13$^a$ a punch 171, adapted to reciprocate in guides 172 and normally impelled toward the strip by a plate spring 173. Suitably mounted upon a shaft 174 is a cam 175 a lug whereon is adapted during each rotation of the shaft to engage the punch and slide it outwardly in the guides 172. Upon the release of the punch by the cam the strip is punctured, as indicated at 176 in Fig. 13$^b$. Any suitable means may be employed to rotate the shaft 174. Herein for the purpose I have represented a beveled gear 177 upon the shaft of the feed roll 162 and meshing with a beveled gear 178 having fast therewith a worm (not shown) meshing with and driving the worm wheel 179 upon the cam shaft 174.

To renew the liquid supply and make good any leakage of the oil within the ram cylinder (see Fig. 36), I have provided an oil supply reservoir 180, supplied from the bottom through a pipe 181 from any suitable source, this pipe containing the check valve 182. At the opposite side of the inlet to the reservoir is a connection 183, leading to the ram cylinder 1, the connection therewith being here made through the pipe 155, which connects said cylinder with the compression recording mechanism illustrated in Fig. 13. Between said connection 183 and the reservoir 180 is a pump 183$^a$ having therein a piston 183$^b$, whereby oil may be forced from the reservoir in to the ram cylinder. A check valve 184 is introduced between the supply reservoir and the ram cylinder. Upon the delivery side of the pump is another check valve 184$^a$, as is usual in pumps. The connection 183 is provided with suitable controlling valves 185, 186 and the exit from the reservoir 180 is provided with a closing valve 187.

By closing the valves 185, 186 the supply of liquid within the reservoir 180 may be renewed, a float 188 at the top indicating exteriorly the level of the oil within the reservoir. When the ram in the cylinder 1 is in its lowermost position resting upon its seat 34 where such seat is employed as herein, if the valves 186 and 187 be opened, oil from the reservoir 180 will gravitate to the ram cylinder and make good any leakage that has taken place therein. The valve 185, when opened, will permit the escape of any air that may have been contained in the oil.

Instead of varying the thickness of the compressed block by introducing a shim 29 between the ejecting head and the base of the block whereon it is mounted, I may force an additional quantity of liquid into the ram cylinder, so that the ram when it recedes, is supported by the oil at a distance above the usual position corresponding to the difference in thickness of the standard block, or block of maximum thickness, and the thinner block that it is desired to make. It is apparent that in this manner a block of any less thickness than the standard block may be readily provided for, and that by suitably operating the piston 183$^b$ between successive compressive strokes of the ram, a block immediately succeeding the standard block, may be made thinner to any desired extent. By the employment of a suitable escape valve, I may readily allow to escape the excess liquid, so that the press may resume the making of blocks of the standard size.

In the embodiment of my invention herein disclosed I have shown the displacing plungers disposed transversely to the line of travel of the ram. This enables me to connect the valve mechanism of the displacing plunger actuators to the timing mechanism in a preferred manner. This construction enables me to utilize gravity to assist the return of my ram and at the same time enables me to arrange my displacing means horizontally so that their traverse is unaffected by their own gravity.

The material from which asphalt and other similar blocks are made is usually such that it is frequently difficult to obtain absolute uniformity in the composition thereof, and in the feed thereof into the mold, with the result that sometimes the blocks will vary in thickness because of the varying amount or composition of the material from which they are compressed. This is particularly true when a new batch of the mixture is first run to the press. It is desirable, however, that the blocks issuing from the press be as nearly as possible uniform in thickness, and to select out those that are either above or below the required thickness my invention contemplates automatic detector and, if desired, detector and selective mechanism, one form of which I will now describe.

Referring to Figs. 7, 11 and 12, mounted upon the bulkhead and immediately in front of the sliding head is a feeler 189, fulcrumed loosely upon a horizontal shaft 190, mounted upon the bulkhead. This shaft is provided with an upright arm 191, formed as a yoke to receive a spring 192 seated at its lower end upon a slide block 193, mounted to slide in said yoke-like arm. To one side of the slide block 193 is pivoted at 194 a block 195, held in the forked end of a link 196, pivotally connected at 197 to said feeler 189. The pivot 194 is projected laterally to overlie the end of a lifter 198, fulcrumed at 199 in suitable bearings in the bulkhead. This lifter is provided with a shoe 200, which is adjustable on and in relation to the lifter by means of a set screw 201. Fast on the front end of the sliding head, and arranged to raise the lifter at each forward movement of said head (see Figs. 11 and 12), is a finger plate 202 which, at each forward movement of the sliding head, passes under the lifter shoe 200 and lifts the latter, together with the slide block 193, to compress the spring 192 in the yoke arm 191, and also lifting the feeler 189. As the sliding head retreats the lifter is dropped and the feeler 189 is also dropped upon the top of the block last compressed and pushed forward onto the feeding out table. If the block is of proper thickness the feeler will be permitted to drop to a given point such as will permit the spring 192 to extend itself to a predetermined extent, leaving the yoke-like arm 191 in a vertical position. If the block is too thick, the feeler will be arrested before it reaches its proper working position, with the result that the spring 192 in order to extend itself will throw the yoke-like arm 191 to the left (Fig. 7), the spring and the link 196 acting, so to speak, like a toggle, tending to straighten itself at each depression of the feeler. If the block last issuing from the mold is too thin, the feeler will drop below its normal position and the spring 192, in order to follow up the feeler in this low position, will cause the yoke-like arm 191 to swing to the right. Expressed differently, the link 196 is a connection between the feeler and the yoke-like arm, which causes the latter to assume a position to the left or to the right of the vertical, according as the block felt of is too thick or too thin, the spring serving as a means for maintaining the connection between the link and the yoke-like arm in any relationship of the two.

Fast on the shaft 190 which carries the yoke-like arm 191 is an upright arm 203 (see Figs. 7 and 37), to the upper end of which is jointed a connecting rod 204. At its free end said rod 204 (see Fig. 4) is threaded to receive two sets of tappet nuts 205, 206 spaced to receive between them the tail of a double acting pawl 207, fulcrumed at 208 on the vertical short arm 209 (see Fig. 37) of a bell crank lever, fulcrumed at 210 on the bulkhead. The tappet nut rod 204 is maintained normally in its midposition by a spring 211, interposed between the tappet nuts 206 and a bearing 212 on the bulkhead.

The horizontal long arm of the bell crank lever last referred to (see Fig. 37) is forked to engage the upper end of a vertically reciprocable and oscillatory shaft 213, mounted in bearings 214 on the bulkhead and frame. The oscillatory shaft 213, at its lower end, passes through a lug 215 on the ejecting head 23, said shaft being provided above and below said lug with fast collars 216, whereby vertical reciprocations of the ram produces corresponding vertical reciprocations of said oscillatory shaft. These vertical reciprocations of the shaft operate through the bell crank lever 209 referred to, to cause oscillations of the double acting pawl 207 (Fig. 4) relative to its ratchet wheel 217, formed on and as a part of the nut 142 (see Fig. 8), which surrounds the feed adjusting rod 139. If said pawl is in midposition neither of its active ends will engage said ratchet wheel and no movement of the latter will result from the oscillations of the pawl. If, however, the block last ejected and acted upon by the feeler 189 (Fig. 7) is too thick, then the arm 203 (Figs. 7 and 37) will assume a position to the left, drawing the connecting rod 204 also to the left, to bring the tappet nuts 205 into position to arrest the tail of the double acting pawl as the latter is oscillated to the right by the elevation of the ram and will cause the left hand active end of said pawl to engage the ratchet wheel 217 to turn the latter in the direction of the arrow (Fig. 4), to screw the feed screw 141 upward, to raise the lowest position of the ejector lever 134 (Fig. 13), thereby to raise the lowest position of the ejecting head and reduce the mold by so much, so as to lessen the amount of material required to fill the mold and the corresponding thickness of the compressed block. If, on the contrary, the block last ejected and acted upon by the feeler 189 (Fig. 7) is too thin, permitting the feeler to drop to a lower position, the vertical arm 203 and its connecting rod 204 will assume a position to the right, causing the tappet nuts 206 to be moved into position to arrest the tail of the double acting pawl on its oscillation to the left thereby throwing the right hand active end of said pawl into engagement with the ratchet wheel 217 to rotate the latter slightly in the direction opposite to the arrow (Fig. 4), to depress the rod 139 and thereby the ejecting head, to deepen the mold so that it may receive additional material for the production of a thicker block.

Referring to Figs. 8 and 42, after the double ended pawl 207 on the bell crank lever 209 has been operated to adjust the mold to correct the dimensions of the blocks compressed therein, said pawl is returned to its midposition by a spring-actuated bevel-ended pin 207ˣ (see Fig. 42), coöperating with a conical recess in the under side of said pawl 207. Thus, the press may be automatic or self-adjusting in that the issuance of any block which is either over or under thickness causes instant adjustment of the mold to receive less or more material, to bring the blocks to the required dimension when fully compressed.

The automatic adjusting mechanism described is, of course, adjusted to compensate for the normal fluctuations in thickness of blocks, due to what might be expected to be the ordinary variations in successive batches of mixture fed to the press, but this automatic mechanism does not in any way interfere with hand adjustment of the mold by means of the wheel 141. Should the conditions at any time require an adjustment in excess of the normal adjustment by the automatic mechanism, the hand adjustment provided for furnishes means therefor.

In addition to the mechanism described, which detects any variation in the thickness of the blocks, and, where desired, automatically adjusts the mold to correct the thickness, I have herein provided means for selecting out and displacing those blocks which are over or under thickness. While the feeler 189 which detects the blocks of improper thickness may conveniently be positioned to act upon and in connection with the blocks immediately as the latter issue from the press, it is not convenient, in this type of my invention, to provide an ejecting or displacing mechanism which will displace a block immediately and before it is pushed along with the series, off the table. In fact, I have found it convenient to arrange the displacing mechanism to act upon the blocks only after they have been fed or pushed along for a distance of about four blocks, and clear of the bulkhead of the press. This has made it necessary to arrange mechanism so as to produce a delayed action of the displacing mechanism. That is to say, the mechanism is such that a block detected as being over or under size upon issuance from the mold is not displaced from the series until it has moved along three steps, or into its fourth position upon the delivery table. To this end, surrounding loosely the lower end of the vertically reciprocable shaft 213 is a time-actuating wheel 218, the hub of which depends within the lowermost bearing 214 for said shaft, and rests upon the collars 216 so that it has a vertical movement with and by the vertical movement of said shaft, moving always with the latter in this respect. The hub of said wheel 218 is grooved to receive a feather in the hub of a bevel gear wheel 219 (see Fig. 37), mounted to rotate in stationary bearings 220 on the frame of the press, said bevel wheel being driven by a mating wheel 221 on the shaft 222. This horizontal shaft 222 (see Fig. 1) is driven at its rear end by gears 223, 224 from the cam shaft 66 of the press. One of the gears 219, 221 (Fig. 37) is mutilated, so as to cause every complete rotation of the shaft 222, of which there is one rotation for each cycle of the press, to produce a quarter rotation only of the time-actuating wheel 218. The actuating wheel 218, therefore, is raised bodily with the ram as each block is compressed and is also given a quarter turn for each movement.

Referring now to Fig. 4, the time-actuating wheel 218 is provided with four radiating arms, each of which is provided at its extremity with a finger 225, pivoted at 226 to permit its end to be swung to one side or the other of a true radius of the wheel. The hub of this finger is serrated at its rear edge, for engagement with the serrated edge of a locking block 227, pressed by a spring 228 constantly in contact with the hub of said finger so that into whatever angular position the finger may be swung it will there remain until positively returned to its original position, or moved to a different position. The several fingers 225 are turned into angular positions at one or the other of the sides of their respective radii, according as the blocks issuing from the mold are over or under thickness. To accomplish this (see Fig. 37), the vertically reciprocatory shaft 213 immediately above the actuating wheel 218 has mounted upon it two horizontal arms 229, 230, the arm 229 being loose on said shaft while the upper arm, 230, is fast thereupon, so as to be raised and lowered and also oscillated with the shaft. The arm 230 serves also as a means for holding the actuating wheel 218 in proper position on and to reciprocate with said shaft.

The lower arm 229 (see Fig. 38) has pivoted radially to its end at 231, a double acting dog 232, overlying which is the arm 230, having downwardly projecting ears 233 at its opposite sides. This arm 230, as stated, is fast on the vertically reciprocatory shaft 213, and the latter, at its upper end (see Fig. 37), is provided with a square extension 234 which (see Fig. 4) carries the hub of an arm 235, which extends forward with its forked end straddling the horizontal tappet nut rod 204 between two collars 236 thereon. When, therefore, the tappet nut rod 204 is moved in one or the other direction it will cause corresponding oscillation of the reciprocatory shaft 213 and the upper arm 230 (Fig. 38) thereon. This will cause one or the other of the depending lugs thereon to act on one or the other end of the double ended pawl 232 on the lower of said arms. Since this pawl overlies the free end of the finger 225 of that particular arm of the time-actuating wheel 218 which chances for the moment to be beneath it, it is clear that any oscillation of the shaft and upper arm 230 thereon, will cause one or the other end of the double acting pawl 232 to be depressed to push the finger 225 underlying it to one or the other side, according to the direction in which said upper arm is oscillated. It matters not in which direction this finger may be swung, so long as it is displaced from its true radial position, to indicate a block which is over or under thickness, said finger as stated remaining in such position until positively returned.

To return the arm 229 to true radial position upon the return of the arm 230, I have provided two pawls 237 upon the arm 229, connected at their upper ends by link 238, and adapted to be rocked by lateral projections 238ˣ upon the arm 230. In the return of the arm 230, as for example, to the right, viewing Fig. 38, the lower face of the right hand pawl 237 rides upon and is positioned by the upper face of the wheel 218, and in the further movement of the arm 230 in the same direction the connected left hand pawl 237 is drawn to the right, thereby forcing the arm 229 to a position radially beneath the arm 230.

One of the fingers 225 having been displaced to indicate a block of improper thickness, said finger is carried by successive quarter rotations of the wheel 218 upon succeeding operations of the press until at the end of the third succeeding operation the displaced finger has been carried around into position next the bulkhead of the press, where it underlies a forked arm 239 (see Figs. 39 to 41, inclusive) fast on a horizontal shaft 240, journaled in bearings 241 on the frame and carrying at its opposite end a vertical displacer arm 242. This displacer arm is fitted at its upper end with a shoe 243, positioned to engage the detected block at the end of its third step of travel and push the same endwise off from the side of the table, said displacer arm intermediate its length (see Fig. 3) being provided with a return spring 244, to furnish its return movement, said spring surrounding a guide rod 245 attached to said arm.

When a finger on one of the arms of the wheel 218 reaches a position beneath the forked arm 239 (Figs. 39 and 41) heretofore referred to, if it be in its normal radial position unchanged by reason of any block of improper thickness, when said wheel is raised by and with the ram and the reciprocatory shaft 213, said finger will pass freely between the ends of said arm and no movement of the displacer arm 242 will result. If, however, said finger has been displaced to one or the other side, as described, by reason of a block of improper thickness, the displaced finger will, as the wheel rises, engage one of the ends of the forked arm 239 and turn the latter and its shaft, to cause the displacer arm 242 to displace the block with which it contacts, being the block detected three cycles earlier upon its issuance from the mold of the press, as being of improper thickness; and it matters not whether the block be over or under thickness and whether the finger be swung to one or the other side, for whichever end of the arm 239 is engaged by the finger, the block will be displaced as described.

To provide for more or less latitude in the thickness of the blocks without causing operation of the displacer arm, I have made the ends of the arm 239 (Fig. 41) adjustable, by means of screws 246, said ends sliding in dovetail guides in the hub of the arm. If the ends are adjusted so closely as barely to permit the fingers 225 to rise between them then any slight error in the thickness of a block will cause displacement of the block; if, on the contrary, said ends be adjusted to provide a considerable clearance then a corresponding latitude will be given for variation in thickness of the blocks without causing displacement thereof.

The lift of the actuator wheel 218 is such as to carry the fingers 225 completely above and free of the forked arm 239, permitting the latter and its connected displacer arm to spring back under the action of the spring 244 to their original normal positions before said wheel, with its finger, descends with the ram to their original positions. The ends of the forked arm are beveled at their inner and upper faces, as best shown in Fig. 39, so that when the wheel finally descends with the ram to its original position the deflected finger 225 will be restored to its normal mid-position, preparatory to the detection of a succeeding defective block.

The material or composition from which the blocks are made is necessarily more or less adhesive, and where the blocks are compressed under an extremely heavy pressure, amounting as a rule in the manufacturing of paving blocks to approximately 300 tons, gross, there may be at times a tendency of the compressed block to adhere to the ram cap which constitutes the bottom of the mold, and prevent the block being readily pushed off from the top of said cap after it has been ejected from the mold without tearing the block. To obviate any difficulty of this sort, I have here provided automatic lubricating means, shown best in Figs. 11 and 12. Referring to these figures, I have mounted upon the front of the sliding head small pumps 247, taking wax, paraffin or other supply of lubricant at the side through a suitable inlet 248, from a suitable wax or other lubricant supply, and delivering through their lower ends at the front of said sliding head and preferably behind a shield 249, applied thereto. The pump plungers are operated by levers 250, supported above the pumps and having an arm 251 arranged to travel along the under side of a cam surface 252 on the bulkhead. When the sliding head is retracted to its extreme position at the right, as in Fig. 12, the pump plungers are elevated to take a supply of lubricant, and as the sliding head advances, pushing from off the top of the elevated ram cap the block last compressed, the said pump plungers will be depressed, to cause the lubricant to be projected downward behind the said shield 249 and upon the top of the plunger cap, as the sliding head traverses the same, thereby properly lubricating the plunger cap so that the next block compressed will not adhere thereto.

My invention, one embodiment of which has been illustrated and described herein, is economical in its steam consumption, because the preliminary compression of the block is effected by a large or low pressure plunger, producing the effect of a low steam pressure, or small relative piston area, and economizes the high steam pressure upon the relatively large piston area for the slight final compression only, which is effected by the high pressure plunger, thus showing distinct economy over presses that are not, so to speak, compounded. Any desired degree of compression may be had by varying the steam pressure, without in any manner affecting or requiring a change in the other parts of the press, because the compressing means is wholly independent in its construction and essential operation from the other parts of the press. That is to say, the remaining parts of the press operate normally whether a pressure of 100 tons or 300 tons be used in compressing the blocks, none of the movements of the remaining mechanism being actuated by the compressing pressure. The pressure for compressing the blocks may be increased to any desired extent without increasing the wear upon the parts other than the mold, there being no wear upon the ram other than that of its packing, and none of the other parts being moved under the compression pressure. Particularly important, however, is the fact that any obstruction to the movement of the sliding head can cause no damage to the press. Mechanical presses now commonly used in the class of work for which my improved press is largely intended have the sliding head actuated from the main power shaft of the press, which must be so heavy and controlled by a fly wheel so massive in order to get the required compression, that any obstruction to the movement of the sliding head or any of the minor parts, cannot be detected and the detection utilized promptly enough to arrest the heavy moving parts before they have caused serious damage to the press. In the press here disclosed the sliding head, which perhaps is most likely to be obstructed in its movements, is actuated in its forward direction by steam, and therefore will, should it encounter an obstruction, come to rest at any point in its movement without affecting in the least the operation of any of the other parts. Should the said head be obstructed in its outward or cam actuated travel, the motor driving the same, which need only be a comparatively low powered motor, will slip its belt, or come to rest, without doing any damage.

In the foregoing and other respects my invention provides for a press constructed and operated in a novel manner and producing results heretofore unattainable in any press adapted for the work, so far as I am acquainted with the same.

Without attempting to refer to all of the meritorious features of the press here disclosed, or of a press made in accordance with the present invention, I desire to emphasize certain features of importance, particularly in connection with a press for use in the manufacture of blocks, tiles and the like from what is commonly known as an asphalt composition. Asphalt blocks, for instance, are laid in competition with sheet asphalt and other pavements which have heretofore been laid at lower prices, and it is obviously highly desirable that they be manufactured and sold at prices to compete therewith. This means that the press in which they are made must be operated not only at high speed but must be capable of continuous operation without interruption due to breakdowns, providing always a very heavy pressure, amounting as a rule to from six to ten thousand pounds to the square inch, aggregating from two to three hundred tons per block. This pressure should be varied more or less, according to the actual speed employed, and ordinarily should be greater as the speed of the press increases. Presses in the asphalt paving block art, where the body material for the blocks is crushed and pulverized stone, are necessarily operated in the presence of much dust, which, if a mechanical press be employed, with all the joints and bearings incident to such type of press, and particularly in the presence of the high pressures necessary in this art, produces excessive wear. This results in frequent stoppages for renewals, and in frequent breakdowns as well, because of the liability of obstruction to some of its parts in the presence of the necessary heavy pressures and stresses. Hydraulic presses, on the other hand, if constructed to produce high pressures or high degrees of compression, have invariably, so far as I am aware, been comparatively slow in point of speed, due largely to the difficulty in circulating the liquid under high pressure at the required speed. Again, the economy of operation of a press of this type is an important consideration; while a high degree of compression is required in the formation of the block, the cost of operating the press must be reduced to the minimum if the product is to be commercially salable.

It will be observed in the press above described and illustrating one embodiment of my invention that the ram, constituting one form of pressure responsive means, operating the movable member or plunger of the mold, and the plunger or plungers, constituting one form of displacing means, are operatively connected by or through the medium of a body of liquid which for a given thickness of block and under normal conditions is substantially constant and of fixed quantity, contained in a closed chamber, the construction being such that the pressure responsive means is always and only responsive to and synchronous with the movement of the displacing means, the whole operating with a directness and responsiveness, and without substantial internal and speed restricting friction or obstruction, not only of the mechanical parts but of the transmission liquid as well, as permits a maximum speed with minimum frictional or other resistance. It will also be observed that the displacing means is, and preferably should be, operated by elastic fluid pressure, which is important because of the varying nature of the block composition acted upon by the press. The elastic or fluid pressure actuation of the displacing means permits the latter to perform always its maximum work upon the composition opposing it, while operating through varying distances, until balanced by the resistance opposed thereto. The plungers herein, operating as described, constitute also one form of compensating means to compensate for varying strokes of the mold plunger. Furthermore, by employing displacing plungers of relatively small diameter and long stroke, preferably compounded as described, in connection with the transmission liquid which serves also as multiplying means, the maximum economy of steam or other pressure or power to actuate the displacing means is obtained, as compared with direct acting steam actuated or mechanical presses.

As heretofore stated, it is of the utmost importance that the mechanical means, or some part connected therewith, for operating the sliding head to cover and uncover the mold shall also determine the times of feed, the ejecting, and displacing of the block, but I prefer that so far as possible said means should be independent of the compressing instrumentalities, because the movements of the former are likely to be interrupted as by foreign substances getting into the block composition, or otherwise. If the compressing instrumentalities were directly connected to the sliding head operating means, any obstruction to the movement of the latter would cause the entire power back of the compressing instrumentalities to be exerted to overcome the obstruction, with inevitable damage to the press, all of which is avoided by the arrangement described which permits the sliding head and its connected parts to be interrupted at any time in their movements without damage due to the simultaneous or succeeding movements of the compressing instrumentalities. In any automatic press, however, the various movements and parts must be correlated so as to perform their respective functions in regular cycles, as if they were directly and mechanically connected throughout. This is accomplished in the press herein described notwithstanding the quite separate and independent sources of power operating in the press, by the arrangement of a rotating member, shown, as a cam, and floating valve mechanism for the plunger piston or pistons controlled thereby, which permits said rotating member to determine or initiate every complete cycle of operation of the press, and insures completion of such cycles within proper times, without such connection between the various parts as would make possible any damage such as above referred to in the event of obstruction in or near the mold. It will be observed that the press here disclosed is single cycle, initially and throughout, contra-distinguished from the slower accumulator types of presses, wherein the pressures are built up by repeated or successive operations of pumps, irrespective of the operations of parts utilizing those pressures.

Claims:

1. A block forming press comprising a bulkhead carrying a mold, a plunger coöperating therewith, a sliding head to cover and uncover said mold, cam mechanism for moving the sliding head in one direction and fluid pressure operating means for moving the same in the opposite direction.

2. A compressing press comprising a bulkhead; a mold; a coöperating plunger to compress material in said mold; an ejector for the compressed material having a gravity actuated return movement; and means for starting such movement.

3. A block forming press comprising a bulkhead, a plunger coöperating therewith, a movable head supported by the bulkhead, and having a pressure receiving portion, means to move said head transversely to the path of travel of the plunger, one or more pistons to impart compressive movement to said plunger, operating means therefor, and means to vary the period of movement of the head operatively to position its pressure receiving portion, with relation to the period of movement of the piston or pistons upon their compressive stroke.

4. A block forming press comprising a bulkhead, a plunger coöperating therewith, a piston or pistons to impart compressive movement to the plunger, operating means for said piston or pistons, adjustable cam mechanism to vary the action of said plunger or plungers and supplementary means for varying such action.

5. A block forming press comprising a bulkhead, a plunger coöperating therewith, a fluid pressure actuated piston or pistons to impart compressive movement to the plunger, and means adjustable during the operation of the press to vary the length of stroke of said piston or pistons.

6. A block press comprising a bulkhead, a movable head having a pressure receiving portion mounted for movement therein, a mold chamber block carried by the bulkhead, and a plunger adapted to coöperate with said head to compress material in said mold chamber, said mold block being extended to form pressure strain receiving bodies above the upper surface of the compressed block.

7. A press comprising in combination a bulkhead, a sliding head, a plunger coöperating with said bulkhead, and a lubricating pump operated by said sliding head to lubricate the block engaging face of the plunger, whereby movement of said sliding head operates said pump when said sliding head and plunger are in proper relation.

8. A press comprising in combination compressing instrumentalities, defective block detecting mechanism, and means controlled thereby to vary the capacity of the mold.

9. A press comprising in combination compressing instrumentalities including a plunger, defective block detecting mechanism coöperating therewith, and means governed by said detecting mechanism to control the non-compressive stroke of the plunger.

10. A press comprising in combination compressing instrumentalities, defective block detecting mechanism, defective block displacing mechanism, and means to delay the action of said displacing mechanism.

11. A press comprising in combination compressing instrumentalities and successively acting defective block detecting mechanism and defective block displacing mechanism.

12. A press comprising in combination compressing instrumentalities, liquid actuated operating means therefor, a plurality of plungers, pistons therefor, and automatically operated means governing the operation of said pistons independently of each other, and also the operation of one of said pistons by another.

13. A press comprising hydraulic compressing instrumentalities in combination with a fluid actuating plunger, its steam actuated piston, and means automatically to increase the pressure imparted by the plunger as the resistance increases until equilibrium is established at full resistance and full boiler pressure.

14. A press containing in combination a bulkhead, a sliding head, fluid actuated means to operate said sliding head in one direction, mechanical means to operate said sliding head in the opposite direction, a ram, a liquid containing chamber therefor, a coacting plunger, and a fluid actuated piston to operate said plunger.

15. A hydraulic press comprising in combination a mold; filling and ejecting means therefor; a reciprocatory ram; a reciprocatory liquid displacing plunger; a receptacle between said ram and said displacing plunger containing a substantially fixed quantity of pressure transmission liquid during the compressing and return strokes of said ram; means actuated by said displacing plunger to control movement thereof, and means automatically to time the relative operation of said displacing plunger and said filling and ejecting means.

16. A hydraulic press comprising in combination a mold; filling and ejecting means therefor; a ram; liquid displacing means; a receptacle between said ram and said displacing means containing a substantially fixed quantity of pressure transmission liquid during compressing and return strokes of said ram; and independently operated means automatically to time the relative operation of said displacing means and said filling and ejecting means.

17. A hydraulic press comprising in combination a mold; means to open and close said mold; a reciprocatory ram; a reciprocatory displacing plunger; a receptacle between said ram and said displacing plunger containing a substantially fixed quantity of pressure transmission liquid during the compressing and return strokes of said ram, and independently operated means automatically to time the relative operation of said displacing plunger and means to open and close said mold.

18. A hydraulic press comprising in combination a mold; means to open and close said mold; a reciprocatory ram; fluid actuated displacing means; a receptacle between said ram and said displacing means containing a substantially fixed quantity of pressure transmission liquid during the compressing and return strokes of said ram; means connected with said displacing means to control movement thereof, and automatically repeating timing means for said press.

19. A hydraulic block press, comprising in combination a reciprocating ram; a mold; means to open and close said mold; means to shift the relative positions of said mold and said mold opening and closing means in a direction transverse to the line of direct pressure of said ram; a chamber containing a substantially fixed quantity of pressure multiplying and transmitting liquid during the compression and return strokes of said ram; a displacing plunger for said liquid; a prime mover for said displacing plunger, and means automatically to time relatively the operation of said prime mover and said means to open and close said mold; said prime mover and its compressing connections being organized and operating to eliminate substantial momentum of the moving parts and effect a balance between the pressure thereof and any resistance that may be opposed thereto.

20. A hydraulic block press, comprising in combination a reciprocating ram; a mold; means to open and close said mold; means to shift the relative positions of said mold and said mold opening and closing means in a direction transverse to the line of direct pressure of said ram; a chamber containing a substantially fixed quantity of pressure multiplying and transmitting liquid during the compression and return strokes of said ram; a displacing plunger for said liquid; a prime mover for said displacing plunger; means automatically to time relatively the operation of said prime mover and said mold opening and closing means, and momentum controlling means for said prime mover and the compressing connections moved thereby.

21. A hydraulic press comprising in combination a mold; means to open and close said mold; a ram; low and high pressure displacing means; a receptacle between said ram and said displacing means completely filled with a substantially fixed quantity of pressure transmission liquid during the cycle of operation of said ram; means to shift the relative positions of said mold and said mold opening and closing means in a direction transverse to the line of direct pressure of said ram and automatically repeating timing means for said press.

22. A hydraulic press containing in combination a mold; mold opening and closing means; a reciprocating ram; displacing means comprising automatically and successively operating fluid actuated high and low pressure plungers of different displacement; means actuated by said plungers to control movement thereof; a receptacle completely filled with a substantially fixed quantity of pressure transmission and multiplying liquid during the cycle of movement of said ram; said ram having a direction of movement transverse to the direction of movement of said plungers, and means automatically to time relatively the movement of said plungers and of said mold opening and closing means.

23. A hydraulic press comprising in combination a mold; means to open and close said mold; a ram; a plurality of displacing plungers of different displacement; a chamber intermediate said ram and said displacing plungers completely filled with a substantially fixed quantity of pressure transmission liquid during the cycle of movement of said ram; said displacing plungers having a movement in a direction transverse to the line of direct pressure of said ram, and automatically repeating timing means for said press.

24. A hydraulic press comprising in combination a mold; means to open and close said mold; a ram, a reciprocating displacing plunger; a chamber between said ram and said displacing plunger completely filled with a substantially fixed quantity of pressure transmission liquid during the cycle of movement of said ram, and independently operated means to automatically time relatively the operation of said displacing plunger and said mold opening and closing means from a single revolving shaft operated through the medium of a worm gear.

25. A hydraulic press comprising in combination a mold; means to open and close said mold; a ram; a reciprocating displacing plunger; a chamber between said ram and said displacing plunger completely filled with a substantially fixed quantity of pressure transmission liquid during the cycle of movement of said ram; and independently operated means to automatically time relatively the operation of said displacing plunger and said mold opening and closing means from a single revolving shaft.

26. A hydraulic press comprising in combination a mold; means to open and close said mold; mold filling and ejecting means; a ram; a reciprocating displacing plunger; a chamber between said ram and said displacing plunger completely filled with a substantially fixed quantity of pressure transmission liquid during the cycle of movement of said ram, and independently operated means to automatically time relatively the operation of said displacing plunger, said mold opening and closing means and said filling and ejecting means from a single revolving shaft.

27. A hydraulic press comprising in combination a mold; means to open and close said mold; a reciprocatory ram; liquid displacing means; a receptacle between said ram and said displacing means containing a substantially fixed quantity of pressure transmission liquid during the cycle of operation of said ram; means to shift the relative positions of said mold and said mold opening and closing means in a direction transverse to the line of direct pressure of said ram, and automatically repeating timing means for said press.

28. A hydraulic press comprising in combination a mold; a ram; low and high pressure liquid displacing plungers; a receptacle between said ram and said displacing plungers completely filled with a substantially fixed quantity of pressure transmission liquid during the cycle of movement of said ram; a check valve for said low pressure plunger; and automatically repeating timing means for said press.

29. A hydraulic press comprising in combination a mold; a ram; low and high pressure displacing plungers; a receptacle between said ram and said displacing plungers completely filled with a substantially fixed quantity of pressure transmission liquid during the cycle of movement of said ram; a check valve for said low pressure plunger opened by the liquid moved by said plunger on its compressing stroke and re-opened by means other than said low pressure plunger to permit the return stroke thereof, and automatically repeating timing means for said press.

30. A hydraulic press comprising in combination a ram; a mold; low and high pressure displacing plungers acting in automatic sequence; a receptacle between said ram and said displacing plungers completely filled with a substantially fixed quantity of pressure transmission liquid during the cycle of movement of said ram; a check valve for said low pressure plunger opened by liquid moved by said plunger on its compressing stroke, closed by independent means and re-opened by means other than said low pressure plunger to permit the return stroke thereof, and automatically repeating timing means for said press.

31. A hydraulic press comprising in combination a mold; a ram; low and high pressure displacing means; a receptacle between said ram and said displacing means completely filled with a substantially fixed quantity of pressure transmission liquid during the cycle of movement of said ram and automatically repeating timing means for said press.

32. A hydraulic block forming press comprising in combination a mold; means to open and close said mold; a ram; a liquid displacing plunger; a receptacle between said ram and said plunger containing normally a substantially fixed quantity of pressure transmitting liquid; means to change the amount of liquid in said chamber to produce blocks of different thickness, and means automatically to time relatively the operation of said displacing plunger and said mold opening and closing means.

33. An automatic hydraulic block press comprising in combination a mold; means to open and close said mold; a chamber containing normally a fixed quantity of pressure transmitting liquid; a displacing plunger to impart movement of said liquid; a compressing ram moved by the movement of said liquid; means whereby the amount of liquid may be varied to change, relatively to said mold, the position of range of movement imparted to said ram, and means automatically to time relatively the operation of said displacing plunger and said means to open and close said mold.

34. A hydraulic press comprising in combination a mold; mold opening and closing means; a receptacle containing a substantially fixed quantity of pressure transmission liquid during each cycle of operation of said press; means responsive to the movement of said liquid; a plurality of automatically operating liquid displacing plungers; means whereby said liquid may be restored to a substantially fixed quantity in case of leakage, and means automatically to time relatively the operation of said displacing plungers and said means to open and close said mold.

35. A hydraulic press containing in combination a mold; means to open and close said mold; a ram; automatically and successively operating liquid displacing plungers of different displacement; a closed chamber containing a substantially fixed quantity of pressure transmission and multiplying liquid intermediate said plungers and said ram, and automatically repeating timing means to cause said mold opening and closing means to make one cycle of operation during each cycle of operation of said plungers.

36. A hydraulic press single cycle initially and throughout, comprising in combination a chamber constantly filled with a substantially fixed quantity of presure transmitting liquid; a mold having a compressing member responsive to movement of liquid in said chamber; displacing means to displace liquid in said chamber in successive steps to effect successive effective movement of said compressing member, and automatically repeating timing means for said press.

37. A hydraulic press single cycle initially and throughout, comprising in combination displacing means; responsive means; a receptacle between them containing a substantially fixed quantity of liquid; a mold; a movable compressing member forming one surface of said mold and means to impart compressing movement to said compressing member at one potential pressure for one part of its movement and at a higher potential pressure for another parts of its movement, and automatically repeating means to time the operation of said press.

38. In a hydraulic press molding instrumentalities comprising a mold and mold cover, one stationary, the other having a movement in a plane parallel to the adjacent surface of the stationary member, means automatically to change relatively the position of the same for filling, covering and uncovering, and automatic filling and ejecting means; compressing instrumentalities comprising a receptacle containing a substantially fixed quantity of liquid, automatically acting displacing means for said liquid, and a part operated independently of said compressing instrumentalities to time automatically the operation of said molding instrumentalities.

39. A hydraulic press comprising in combination a mold; automatic filling and ejecting means therefor; pressure responsive means; a receptacle constantly filled with a substantially fixed quantity of liquid to transmit power to said responsive means; displacing means for said liquid; a prime mover to operate said displacing means, and means independent of said prime mover for automatically timing the other moving parts of said press.

40. A hydraulic press comprising in combination a mold; means to open and close said mold; a compressing member; a receptacle of substantially constant volume containing a substantially fixed quantity of liquid to transmit power to said compressing member; displacing means for said liquid; an automatic actuator for said displacing means; means to shift the relative positions of said mold and said mold opening and closing means in a direction transverse to the line of direct pressure of said compressing means, and means independent of said actuator for automatically timing the operation of said means to open and close said mold.

41. A high speed, high power, automatically timed, hydraulic block press comprising in combination a mold having a movable member; a reciprocatory ram to move said member; a prime mover for said press; a closed pressure system between said prime mover and said ram constantly filled with a substantially fixed quantity of pressure multiplying and transmitting liquid whereby all of said liquid is utilized in transmitting power from said prime mover to said ram in each cycle of operation of the former.

42. A hydraulic press comprising in combination a mold; means to open and close said mold; liquid displacing means; a closed chamber constantly filled with a substantially fixed quantity of power transmitting liquid; means always and only responsive to movement of said displacing means through the medium of said liquid; and automatically repeating operating means timed automatically to cause said mold opening and closing means and said responsive means each to make one cycle of operation during each cycle of operation of said displacing means.

43. A hydraulic press comprising in combination a mold; mold filling and ejecting means; liquid displacing means; a closed chamber constantly filled with a substantially fixed quantity of power transmitting liquid; means always and only responsive to movement of said displacing means through the medium of said liquid; and automatically repeating operating means timed automatically to cause said mold filling and ejecting means and said responsive means each to make one cycle of operation during one cycle of operation of said displacing means.

44. A high speed, high power, hydraulic press comprising in combination a mold, a receptacle containing a substantially fixed quantity of pressure transmission liquid; means responsive to the movement of said liquid; a plurality of displacing plungers of different displacement for said liquid; and automatically repeating timing means for said press.

45. In a hydraulic press the combination of the following instrumentalities, viz: a chamber constantly filled with a substantially fixed quantity of power transmitting liquid; a mold having a compressing member responsive to the movement of the liquid in said chamber; means to relieve pressure upon the contents of said mold; means to open and close said mold; a pressure receiving member for said mold; means automatically to move said mold and pressure receiving member relatively into and out of pressure applying relation; fluid actuated liquid displacing means for the liquid in said chamber and means to determine pressure at said mold and to fill and to eject therefrom.

46. A high speed, high power, automatic, hydraulic press comprising in combination a mold; a pressure receiving member therefor; means automatically to move said mold and pressure receiving member into and out of pressure applying relation in a direction transverse to the line of direct pressure on said mold; filling and ejecting means for said mold; pressure responsive means; liquid displacing means; a receptacle between said responsive means and said displacing means containing a substantially fixed quantity of pressure transmission liquid during the cycle of operation of said responsive means, and means automatically to time the relative operation of said displacing means and said filling and ejecting means.

47. A hydraulic press comprising in combination a mold; a pressure receiving member therefor; means automatically to move said mold and pressure receiving member into and out of pressure applying relation; liquid displacing means; reciprocatory pressure responsive means; a receptacle between said displacing means and said responsive means completely filled with a substantially fixed quantity of liquid during the cycle of movement of said responsive means; compressing means operative by the stroke of said responsive means and receiving therefrom a predetermined potential pressure, and automatically repeating timing means for said press.

48. A hydraulic press comprising in combination a mold; means to open and close said mold; pressure responsive means; liquid displacing means; a receptacle between said responsive means and said displacing means containing a substantially fixed quantity of pressure transmission liquid during the compressing and return strokes of said responsive means; means to shift the relative positions of said mold and said mold opening and closing means in a direction transverse to the line of direct pressure of said responsive means, and automatically repeating timing means for said press.

49. A hydraulic press comprising in combination a mold; means to open and close said mold; pressure responsive means; liquid displacing means; a liquid power transmission system closed at least during the effective stroke of said responsive means and utilizing a substantially fixed quantity of liquid during each effective stroke thereof; means to shift the relative positions of said mold and said mold opening and closing means in a direction transverse to the line of direct pressure of said responsive means, and automatically repeating timing means for said press.

50. A hydraulic press comprising in combination a mold; mold closing means; pressure responsive means; liquid displacing means; a receptacle between them containing a substantially fixed quantity of pressure transmission liquid during successive compressing and return strokes of said pressure responsive means, and automatically repeating timing means for said mold closing means, and said liquid displacing means.

51. A hydraulic press comprising in combination a mold; mold closing means, one stationary, the other having a movement in a plane parallel to the adjacent surface of the stationary member; compressing means; liquid displacing means; a receptacle between said compressing and said displacing means containing a substantially fixed quantity of pressure transmission liquid during the cycle of operation of said compressing means, and independently operated means automatically to time the relative operation of said displacing means and said mold closing means.

52. A hydraulic press comprising in combination a mold; mold closing means a compressing member for said mold; means to vary the limit of mold filling stroke thereof; a closed chamber containing a substantially fixed amount of power transmitting liquid during the compressing and mold filling strokes of said mold compressing means;

53. A hydraulic press comprising in combination a mold; pressure responsive means; liquid displacing means; means connected to said displacing means to control movement thereof; a receptacle between said displacing means and said responsive means containing a substantially fixed quantity of power transmission liquid during the compression and return strokes of said responsive means; means to effect a predetermined potential pressure upon said means, and automatically repeating timing means for said press.

54. A hydraulic press comprising in combination a mold; a compressing member for said mold having a variable stroke; a chamber constantly filled with a substantially fixed quantity of transmission liquid to transmit pressure to said compressing member and combined compensating and displacing means for said liquid, whereby an increased amount of material in said mold will decrease the stroke of said displacing means.

55. A hydraulic press comprising in combination a mold having a compressing member with a variable compressing stroke dependent upon the resistance opposed thereto; a chamber constantly filled with a substantially fixed amount of liquid for transmitting power to said compressing member, and an automatically repeating displacing plunger operated by an elastic fluid actuated prime mover, said elastic fluid acting as a compensator for said variable compressing stroke.

56. A hydraulic press comprising in combination a mold having a compressing member with a variable compressing stroke dependent upon the resistance opposed thereto; a receptacle of substantially constant volume containing a normally fixed amount of liquid for transmitting power to said compressing member and automatically repeating compensative displacing means for said liquid, said compressing member having a movement in a direction transverse to the direction of movement of said displacing means.

57. A hydraulic press comprising in combination a mold having a movable member; responsive means to move said member; operating means; a closed pressure liquid transmission system between said responsive and operating means to transmit compressing movement from the latter to the former, said responsive means and said movable member having a movement in a direction transverse to the direction of movement of said operating means, and automatically repeating timing means for said press.

58. A hydraulic press comprising in combination a mold; a pressure receiving member therefor; compressing means comprising a closed chamber containing a substantially constant body of transmission liquid; automatically acting displacing means for said liquid; means automatically and slidably to shift the relative position of said mold and pressure receiving member into and out of pressure applying relation in a direction transverse to the line of direct pressure of said compressing means, and automatic timing means for said press.

59. A hydraulic press comprising in combination a mold; means to open and close said mold; a single casting containing compressing means; liquid displacing means; a chamber constantly filled with a substantially constant body of pressure transmitting liquid between said displacing and said compressing means, and automatically repeating timing means for said displacing means and for said means to open and close said mold.

60. A hydraulic press containing in combination a mold; a reciprocating head above said mold comprising mold filling and pressure receiving instrumentalities, means to move said head into pressing, mold filling and mold emptying positions; a ram, operating a movable mold member liquid displacing means; a chamber constantly filled with a substantially constant body of pressure transmitting liquid intermediate said ram and said displacing means, and automatically repeating means to time relatively the operation of said displacing means and said head moving means.

61. A hydraulic press comprising in combination a mold; mold opening means; a ram having a movement in a direction transverse to the direction of movement of said mold opening means; a chamber constantly filled with a constant body of power transmission liquid; displacing means for said liquid; said mold opening means and said displacing means being automatically timed from a common source, but otherwise independently operated.

62. A hydraulic press comprising in combination a mold; mold closing means, one stationary, the other having movement in a plane parallel to the adjacent surface of the stationary member; a receptacle constantly filled with a substantially constant body of pressure multiplying and transmitting liquid; pressure responsive means; liquid displacing means; means whereby movement of said displacing means transmits a predetermined potential pressure to said responsive means at every cycle of operation of said displacing means, and automatically repeating timing means for said press.

63. A high speed, high power, automatic hydraulic press comprising in combination a mold; means to open and close said mold; a receptacle containing a substantially constant body of pressure multiplying and transmitting liquid; displacing operating means for said liquid; a reciprocatory ram responsive always and only to movement of said displacing operating means; means to effect a predetermined potential pressure upon said ram; means to shift the relative positions of said mold and said mold opening and closing means in a direction transverse to the line of direct pressure of said ram, and automatically repeating timing means for said press.

64. A hydraulic press comprising in combination a mold; mold closing means, one stationary, the other having a movement in a plane parallel to the surface of the stationary member; pressure responsive means; displacing means; a closed chamber intermediate said responsive means and said displacing means containing a substantially constant body of transmission liquid all of which is utilized in transmitting power to said responsive means at every cycle of operation of said displacing means, and automatically repeating timing means for said press.

65. A hydraulic press comprising in combination a mold, a receptacle containing a substantially constant body of power transmitting liquid; means responsive to the movement of said liquid; compensative liquid displacing means having a movement in a direction transverse to the direction of movement of said responsive means, and means automatically to cause a cycle of operation of said responsive means for and at each cycle of operation of said displacing means.

66. A hydraulic press comprising in combination a mold; a compressing member therefor; means to vary the limit of mold filling stroke thereof; a closed chamber containing a substantially constant body of power transmitting liquid; liquid displacing means, and automatically repeating timing means for said press.

67. A hydraulic press comprising in combination a mold; a single casting containing compressing means; displacing means; a chamber constantly filled with a substantially constant body of pressure transmitting liquid between said displacing and said compressing means, and automatically repeating timing means for said press.

68. In a hydraulic press the combination of the following instrumentalities, viz: a liquid containing chamber of substantially constant volume; a mold having a compressing member responsive to movement of the liquid in said chamber; means to open and close said mold; means to eject the contents of said mold; fluid actuated self-controlled liquid displacing means for said chamber, and means independent thereof automatically to open, close and to eject from said mold.

69. A hydraulic press comprising in combination a mold; a liquid containing chamber of substantially constant volume; compressing instrumentalities responsive to movement of liquid in said chamber; displacing means for said liquid; and means to effect successive movements of said compressing instrumentalities at different pressures to produce step compression of the contents of said mold.

70. A hydraulic press comprising in combination a mold; a pressure receiving member, one stationary, the other having a movement in a plane parallel to the adjacent surface of the stationary member; compressing means comprising a closed chamber containing a substantially constant body of transmission liquid; automatically acting displacing means for said liquid; means automatically and slidably to move said mold and pressure receiving member into and out of pressure applying relation, and automatic filling and ejecting means for said mold.

71. A hydraulic press comprising in combination a mold; a pressure receiving member; compressing means comprising a closed chamber constantly filled with a substantially constant body of transmission liquid; automatically acting displacing means for said liquid; and independently operated automatic means to slide said mold and pressure receiving member into and out of pressure applying relation.

72. A hydraulic press comprising in combination a mold; means to open and close said mold; a chamber constantly filled with a substantially constant body of power transmission liquid; a compressing member responsive to movement of said liquid; displacing means for said liquid; means to limit the movement of said displacing means, and means to shift the relative positions of said mold and said mold opening and closing means in a direction transverse to the line of direct pressure of said compressing means.

73. A hydraulic press comprising in combination a mold; a compressing member therefor; a reciprocatory ram to transmit pressure to said compressing member; liquid displacing means; a receptacle constantly filled with a substantially constant body of liquid intermediate said displacing means and said ram, and yielding means coöperating with said displacing means and said ram to predetermine the pressure transmitted by said compressing member.

74. A hydraulic press single cycle initially and throughout, comprising in combination a mold; a chamber constantly filled with a substantially constant body of pressure transmitting liquid; compressing instrumentalities relatively responsive to movement of liquid in said chamber; a prime mover; displacing means for said liquid operated by said prime mover, and means to effect successive relative movements of said compressing instrumentalities to produce compression in separate steps.

75. A high speed, high power, automatic hydraulic press comprising in combination a mold provided with a compressing plunger having a variable drop; a cushioning device to prevent shock upon the drop of said plunger; a receptacle containing a substantially constant body of liquid to transmit pressure to said compressing plunger; and automatically repeating displacing means for said liquid.

76. A hydraulic press comprising in combination a mold; means to open and close said mold; a chamber containing a substantially constant body of power transmitting liquid; a compressing member for said mold responsive to movement of said liquid and a prime mover for said liquid every cycle of operation of which moves said compressing member through its entire compressing movement.

77. A hydraulic press comprising in combination a mold; means to open and close said mold; actuating means; a compressing ram synchronously responsive to every movement of said actuating means and operatively connected thereto by transmission liquid, means to shift the relative positions of said mold and said mold opening and closing means in a direction transverse to the line of direct pressure of said compressing ram, and automatically repeating operating means for said press.

78. A hydraulic press comprising in combination a mold; means to open and close said mold; pressure responsive means; liquid displacing means; liquid power transmission means intermediate said responsive and said displacing means, said responsive means having a movement for and synchronously with every movement of said displacing means, and automatically repeating timing means for said press.

79. A hydraulic press comprising in combination a mold; automatic filling and ejecting means therefor; automatic actuating means; a receptacle of substantially constant volume containing pressure transmitting liquid; a mold compressing member synchronously responsive to movement of said actuating means through the medium of said transmission liquid, and automatically repeating timing mechanism for said press.

80. A hydraulic press comprising in combination a mold; filling and ejecting means therefor; a receptacle containing power transmission liquid; automatic displacing means therefor; a member synchronously responsive always and only to movement of said displacing means through the medium of said liquid transmission means, and automatically repeating operating means for said press.

81. A hydraulic press comprising in combination a mold; means to open and close said mold; pressure responsive means; liquid displacing means; liquid power transmission means intermediate said responsive and said displacing means; said displacing means having a movement for and synchronously with every movement of said responsive means, and automatically repeating timing means for said press.

82. A hydraulic press comprising in combination a mold; means to open and close said mold; pressure responsive means; displacing means; liquid power transmission means intermediate said responsive means and said displacing means, said displacing means having a movement synchronous and in corresponding direction with every movement of said responsive means, and automatically repeating timing means for said press.

83. A high speed, high power, automatic, hydraulic block press comprising in combination a mold; mold filling and ejecting means; liquid power transmission means; automatic liquid displacing means; pressure responsive means synchronously responsive to the movement of said displacing means, and automatically repeating timing means for said filling, ejecting, and responsive means respectively timed for complete operation at each cycle of operation of said displacing means.

84. A hydraulic press comprising in combination a mold; means to open and close said mold; a reciprocatory displacing plunger, a reciprocatory ram, in both of which the stroke displacement is the same and in both of which the movements are synchronous; means to shift the relative positions of said mold and said mold opening and closing means in a direction transverse to the line of direct pressure of said ram, and automatically repeating timing means for said press.

85. A hydraulic press comprising in combination a receptacle containing power transmission liquid; a mold; means responsive to the movement of said liquid coöperating with said mold; displacing means for said liquid, said responsive and displacing means having synchronous cycles of operation, and automatically repeating timing means for said press.

86. A high speed, high power, automatic, hydraulic press comprising in combination displacing means; a mold; pressure responsive means coöperating with said mold; liquid power transmission means whereby all power delivered to said responsive means is transmitted synchronously from said displacing means, and automatically repeating timing means for said press.

87. A hydraulic press comprising in combination reciprocatory displacing means; a mold; and reciprocatory responsive means coöperating with said mold, in both of which displacing and responsive means the stroke dsiplacement is the same, the movements thereof being synchronous, and automatically repeating timing means for said press.

88. A hydraulic press comprising in combination a mold; means to open and close said mold; a liquid containing chamber; displacing means for said liquid; means responsive only and always to the movement of said liquid by said displacing means, and means automatically to time relatively the operation of said displacing means and said mold opening and closing means.

89. A hydraulic block press comprising in combination a mold; pressure responsive means; liquid displacing means; a body of pressure transmission liquid intermediate said displacing means and said responsive means, said responsive means being always and only responsive to movement of said displacing means; block ejecting means, block removing means, and means automatically to time relatively the operation of said displacing means and said block removing means.

90. A high speed, high power, automatic, hydraulic press comprising in combination a mold; means to open and close said mold; a liquid displacing plunger; a compressing ram always and only responsive to movement of said displacing plunger; a chamber containing power transmission liquid operatively connecting said plunger and ram, said parts organized and operating to substantially eliminate speed restrictive influence of said liquid in the operation of said press, and means automatically to time relatively the operation of said mold opening and closing means and said compressing ram.

91. A hydraulic press comprising in combination a mold; mold closing means; means to change relatively the position of said mold and said mold closing means; liquid displacing means; pressure responsive means, a body of pressure transmission liquid intermediate said displacing means and said responsive means, said responsive means being always and only responsive to movement of said displacing means, and automatic means to time relatively the operation of said responsive means and said mold closing means.

92. An automatic high speed, high power hydraulic press comprising in combination a mold; means to open and close it; a chamber containing power transmission liquid; a liquid displacing plunger; a ram operated by said liquid and always and only responsive to movement of said displacing plunger; said chamber and liquid having the capacity to transmit high pressures at high speed to said ram without substantial hydraulic resistance, and means automatically to time relatively the operation of said plunger and said mold opening and closing means.

93. A hydraulic press comprising in combination a mold; a liquid containing chamber; displacing means for said liquid; means coöperating with said mold responsive only and always to the movement of said liquid by said displacing means, and automatically repeating timing means for said press.

94. A hydraulic press comprising in combination a mold; a compressing member therefor; a receptacle containing a substantially fixed quantity of liquid to transmit power to said compressing member; compensative displacing means for said liquid; a prime mover for said displacing means, and means automatically to increase the pressure transmitted from said prime mover to said compressing member until its maximum pressure is balanced by the resistance of the material under compression in said mold or until the power of said prime mover is automatically cut off.

95. A hydraulic press comprising in combination a mold; a mold plunger; a receptacle containing a substantially constant body of liquid for transmitting power to said mold plunger; compensative displacing means for said liquid; a prime mover for said displacing means, and means automatically to increase the pressure transmitted to said mold plunger up to the point at which it is balanced by the resistance opposed thereto or until the power of said prime mover is automatically cut off.

96. A high speed, high power, automatic hydraulic press comprising in combination a mold; a compressing member therefor; a receptacle containing a substantially constant body of power transmission liquid to transmit power to said compressing member; compensative displacing means for said liquid; a prime mover for said displacing means, and means automatically to increase the pressure transmitted from said prime mover to said compressing member until its pressure is balanced by the resistance of the material compressed in the mold or until the power of said prime mover is automatically cut off.

97. A hydraulic press comprising in combination a mold; automatic filling and ejecting means; fluid actuated displacing means; means connected to said displacing means to control movement thereof; liquid power transmission means; pressure responsive means responsive to movement of said liquid, and means automatically to increase the pressure imparted to said displacing means as and until the opposed resistance thereto reaches the point of equilibrium therewith.

98. A hydraulic press comprising in combination a mold having a movable member; pressure responsive means to move said member; a closed chamber constantly filled with a substantially fixed quantity of pressure multiplying and transmitting liquid; operating means for said press; means automatically to impart power to said operating means until an opposed equilibrium is established, and automatically repeating operating means for said press.

99. A high speed, high power, automatic, hydraulic press comprising in combination a mold; means to open and close said mold; ejecting means; a receptacle containing power transmission liquid; compressing means responsive to the movement of said liquid; elastic fluid actuated displacing means for said liquid; means connected with said displacing means to control movement thereof, and means automatically to operate said displacing means and to operate one cycle of said opening, closing, compressing and ejecting means during each cycle of operation of said displacing means.

100. A hydraulic press comprising in combination a mold; compressing means; fluid actuated displacing means; means actuated by said displacing means to control movement thereof; liquid power transmission means intermediate said displacing and said compressing means; mold filling means, and automatically timed controlling means to cause operation of said compressing and said filling means at each cycle of operation of said displacing means.

101. A hydraulic press comprising in combination a mold; mold filling and ejecting means; pressure responsive means; fluid actuated displacing means; means actuated by said displacing means to control the movement thereof; liquid power transmission means intermediate said responsive and said displacing means and means timed automatically to cause said responsive, filling and ejecting means each to make one cycle of operation during one cycle of operation of said displacing means.

102. A hydraulic press comprising in combination a mold; automatic filling and ejecting means; a compressing member for said mold; pressure responsive means to move said compressing member; liquid power transmission means; fluid actuated displacing means for said liquid; means actuated by said displacing means to control movement thereof, and means to cause said compressing member and said automatic filling and ejecting means each to make one cycle of operation during one cycle of operation of said displacing means.

103. A high speed, high power, automatic hydraulic press comprising in combination a mold; means to open and close said mold; a compressing member for said mold; pressure responsive means to move said compressing member; liquid power transmission means; fluid actuated displacing means for said liquid; means connected with said displacing means to control movement thereof, and means to cause said compressing member and said mold opening and closing means each to make one cycle of operation during one cycle of operation of said displacing means.

104. In a hydraulic press the combination of the following instrumentalities, viz: a chamber constantly filled with a substantially constant body of pressure transmitting liquid; a mold having a compressing member responsive to movement of liquid in said chamber; fluid actuated liquid displacing means for said chamber, means actuated by said displacing means to control the movement thereof, and independently operated means to effect the movement of said displacing member.

105. A hydraulic press comprising in combination a mold; mold closing means; compressing means; liquid pressure transmission means; fluid actuated displacing means; means actuated by said displacing means to control the movement thereof, and means automatically to time the operation of said displacing means relatively to the operation of said mold closing means.

106. In a hydraulic press the combination of the following instrumentalities, viz: compressing instrumentalities comprising fluid actuated liquid displacing means, a closed chamber containing power transmitting liquid; a ram responsive always and only to movement of said displacing means, means actuated by said displacing means to control movement thereof; molding instrumentalities comprising a mold, and means to open and close said mold; and an actuator independent of said compressing instrumentalities to time relatively the action of said compressing instrumentalities and of said molding instrumentalities.

107. In a hydraulic press the combination of the following instrumentalities, viz: compressing instrumentalities comprising fluid actuated displacing means, means actuated by said displacing means to control movement thereof; a liquid containing chamber; a ram responsive always and only to movement of said displacing means; molding instrumentalities comprising a mold, means to open, fill, close and eject from said mold, and an actuator independent of said compressing instrumentalities for said molding instrumentalities.

108. In a hydraulic press the combination of the following instrumentalities, viz: a liquid containing chamber; a mold having a compressing member responsive to movement of the liquid in said chamber; fluid actuated liquid displacing means for said chamber; means connected with said displacing means to control movement thereof, and independently operated means to open and close said mold.

109. In a hydraulic press the combination of the following instrumentalities, viz: a chamber constantly filled with a substantially constant body of power transmitting liquid; a mold having a compressing member responsive to movement of liquid in said chamber; fluid actuated liquid displacing means for said chamber; means actuated by said displacing means to control movement thereof, and a part operated independently of said displacing means to time the operation thereof.

110. In a hydraulic press the combination of the following instrumentalities, viz: a chamber constantly filled with a substantially constant body of pressure transmitting liquid; a mold having a compressing member responsive to movement of liquid in said chamber; fluid actuated liquid displacing means for said chamber; means actuated by said displacing means to control movement thereof, and independently operated means to eject the contents of said mold.

111. A hydraulic press comprising in combination a mold; compressing means; fluid actuated displacing means timed therewith; liquid power transmitting means intermediate said responsive means and said displacing means; means actuated by said displacing means to control movement thereof, and means to vary the receptive capacity of said mold.

112. A press comprising in combination a mold; a compressing member for said mold; liquid power transmission means; elastic fluid actuated displacing means to apply directly to said liquid a potentially constant pressure on the contents of said mold during a part of the compression thereof and a higher potentially constant pressure thereon during the remainder of the compression thereof; means actuated by said displacing means to control movement thereof, and automatically repeating timing means to cause said compressing member to make one cycle of operation during each cycle of operation of said displacing means.

113. A high speed, high power, automatic hydraulic press comprising in combination a mold; means to open and close said mold; a compressing member for said mold; means to vary the limit of the mold filling stroke thereof; liquid power transmission means; elastic fluid actuated displacing means acting directly upon said transmission liquid; means connected with said displacing means to control movement thereof; automatically repeating timing means to time relatively the operation of said displacing means and the opening and closing of said mold, and means to effect a part of the compressing action under one potential pressure and another part of said compressing action under a higher potential pressure.

114. A hydraulic press comprising in combination a mold; a mold plunger having an adjustable drop and a compressing movement determined by the resistance opposed thereto; an automatically repeating elastic fluid actuator for and timed with said mold plunger; means connected to said actuator to control movement thereof, and power transmitting liquid intermediate said actuator and said mold plunger for transmitting movement of one to the other and adapted effectively to pick up and move said compressing member in whatever position of adjustment the latter may be found.

115. A hydraulic press comprising in combination a mold; a mold plunger having a variable drop and a compressing movement determined by the resistance opposed thereto; an automatically repeating elastic fluid actuator for said mold plunger; means actuated by said actuator to control movement thereof, and power transmitting liquid intermediate said actuator and said mold plunger for transmitting movement of one to the other.

116. A hydraulic press comprising in combination a mold; means to open and close said mold; a compressing member for said mold; liquid power transmitting means; elastic fluid actuated displacing means acting directly upon said transmitting liquid; means connected with said displacing means to control movement thereof; means to shift the relative positions of said mold and said mold opening and closing means in a direction transverse to the line of direct pressure of said compressing member; and means automatically to cause said mold opening and closing means to make one cycle of operation synchronously with one cycle of operation of said displacing means.

117. A hydraulic press comprising in combination a mold; filling and ejecting means for said mold; a compressing member for said mold; liquid power transmission means; elastic fluid actuated displacing means acting directly upon said transmission liquid; means actuated by said displacing means to control movement thereof, and automatically repeating timing means to time relatively the operation of said displacing and said filling and ejecting means.

118. A hydraulic press comprising in combination a mold; a pressure receiving member for said mold; liquid power transmission means; elastic fluid actuated displacing means acting directly upon said transmission liquid; means connected with said displacing means to control movement thereof, and automatically repeating timing means relatively to time the operation of said displacing means and to bring said mold and pressure receiving member into and out of pressure applying relation.

119. A hydraulic press comprising in combination a mold; means to open and close said mold; a compressing member for said mold; liquid power transmitting means; elastic fluid actuated displacing means acting directly upon said transmitting liquid; means actuated by said displacing means to control movement thereof, and automatically repeating timing means relatively to time the operation of said displacing means and the opening and closing of said mold.

120. A hydraulic press comprising in combination a mold; a ram; a receptacle containing pressure transmission liquid; displacing means for said liquid, a fluid operated actuator for said displacing means and means dependent upon the movement of said displacing means to control the pressure imparted to said fluid operated actuator.

121. A hydraulic press comprising in combination a mold; means to open and close said mold; means to shift the relative positions of said mold and said mold opening and closing means in a direction transverse to the line of direct pressure of a compressing plunger; a receptacle containing a substantially constant body of liquid for transmitting and multiplying pressure; a compressing ram responsive to the movement of said liquid; fluid actuated compensative liquid displacing means, and means to cause a cycle of operation of said ram and of said mold opening and closing means for a d at each cycle of operation of said displacing means.

122. A hydraulic press comprising in combination a mold; a receptacle constantly filled with a substantially constant body of power transmitting liquid; means responsive to the movement of said liquid; compensative fluid actuated liquid displacing means; means actuated by said displacing means to control movement thereof, and means to cause a cycle of operation of said responsive means for and at each cycle of operation of said displacing means.

123. A hydraulic press, single cycle initially and throughout, comprising in combination a mold having a compressing member; a single cycle, shaft timed fluid pressure actuator therefor; liquid transmission means intermediate said actuator and compressing member, and shaft operated mold filling and ejecting means.

124. A hydraulic press, single cycle initially and throughout, comprising in combination a mold; fluid actuated shaft timed hydraulic compressing instrumentalities and shaft operated mold filling and ejecting instrumentalities.

125. A hydraulic press comprising in combination a mold; a compressing member therefor; means to vary the limit of movement thereof on the mold filling stroke; a fluid actuated reciprocating displacing member having a travel normally determined by resistance opposed thereto; power transmitting and pressure multiplying liquid intermediate said displacing member and said compressing member and transmitting movement of one to the other and constructed to pick up and move said compressing member in whatever position of adjustment the latter may be found; means automatically to control movement of said displacing member in accordance with the resistance opposed thereto, and automatically repeating timing means for said press.

126. A hydraulic press comprising in combination a mold; mold opening and closing means; a compressing member for said mold; means to vary the limit of movement of said compressing member on the mold filling stroke; a fluid actuated reciprocating displacing member having a travel normally determined by the resistance opposed thereto; power transmitting and pressure multiplying liquid intermediate said displacing member and said compressing member and transmitting movement from one to the other; means automatically to control said displacing member in accordance with the resistance opposed thereto, and automatically repeating timing means for said displacing member and for said mold opening and closing means.

127. A hydraulic press comprising in combination a mold; mold filling and ejecting means; a compressing member for said mold; means to vary the limit of movement of said compressing member on the mold filling stroke; a fluid actuated reciprocating displacing member having a travel normally determined by the resistance opposed thereto; power transmitting and pressure multiplying liquid intermediate said displacing member and said compressing member and transmitting movement from one to the other; means automatically to control said displacing member in accordance with the resistance opposed thereto, and automatically repeating timing means for said displacing member and for said mold filling and ejecting means.

128. A hydraulic press comprising in combination a mold; mold opening and closing means; a mold plunger; liquid power transmission means; a reciprocatory actuator therefor with means for furnishing variable power within predetermined limits automatically responsive to the resistance opposed to said mold plunger in one direction and to resistance other than the compressing action of said mold plunger in an opposite direction, and automatically repeating timing means for said actuator and for said mold opening and closing means.

129. A press comprising in combination a mold; a mold plunger; a steam cylinder having a reciprocatory member; means connecting said reciprocatory member and said mold plunger; conduit means to conduct steam alternately to and from each side of said reciprocatory member, and means, irrespective of the main valve of said cylinder, whereby said conduit may be increased to a greater area when conducting steam from the non-compressing end of said cylinder than the area thereof when admitting steam thereto.

130. A press comprising in combination a steam cylinder having a reciprocatory member; conduit ports to conduct steam alternately to and from each side of said reciprocatory member, and means whereby one port may be reduced to a predetermined area when conducting steam to said cylinder on the non-compressing stroke thereof and left free when used as an exhaust port.

131. An automatic hydraulic press comprising in combination a mold; a ram; liquid transmission means; automatic fluid actuated displacing means; automatic floating valve mechanism to control said displacing means, and an automatic controller to control the fluid let in by said floating valve mechanism on the return stroke of said displacing means.

132. An automatic press comprising in combination a mold; a ram; liquid power transmission means; automatic fluid actuated displacing means and a port in the fluid actuator of said displacing means, automatically adjustable to different sizes on the operative and return strokes of said displacing means.

133. An automatic press comprising in combination a mold; a ram; automatic, reciprocating, elastic fluid actuated means to operate said ram; liquid power transmission means and means fixedly to regulate the admission of elastic fluid to said reciprocating means in one direction independently of the main valve mechanism.

134. A hydraulic press comprising in combination a mold; a reciprocating ram; a body of liquid to transmit pressure to said ram, liquid displacing means to impart pressure to said liquid; a fluid actuated piston to supply power to said displacing means; a cylinder for said piston, and means to vary arbitrarily the speed with which fluid fills said cylinder on its displacing stroke.

135. A hydraulic press comprising in combination a mold; mold opening and closing means; a compressing member for said mold; fluid actuated displacing means; liquid power transmission and pressure multiplying means between said displacing means, and said compressing member; floating valve mechanism to control said displacing means; and automatically repeating mechanism relatively to time the operation of said displacing means and of said mold opening and closing means.

136. A hydraulic press comprising in combination a mold; mold filling and ejecting means; a compressing member for said mold; fluid actuated displacing means; liquid power transmission and pressure multiplying means between said displacing means and said compressing member; floating valve mechanism to control said displacing means, and automatically repeating mechanism relatively to time said displacing means and said mold filling and ejecting means.

137. A hydraulic press comprising in combination a mold; mold opening and closing means; a compressing member for said mold; fluid actuated displacing means; liquid power transmission and pressure multiplying means between said displacing means and said compressing member; floating valve mechanism to control said displacing means; an auxiliary controller for said displacing means, and automatically repeating mechanism relatively to time said displacing means and said mold opening and closing means.

138. A hydraulic press comprising in combination a mold; mold opening and closing means; reciprocating pressure responsive means; a chamber containing pressure transmitting and multiplying liquid; fluid actuated displacing means for said liquid; floating valve mechanism to control said displacing means; auxiliary arresting means independent of said floating valve mechanism for arresting the movement of said displacing means and automatically repeating mechanism relatively to time the operation of said displacing means and of said mold opening and closing means.

139. A hydraulic press comprising in combination a mold; mold opening and closing means; reciprocating pressure responsive means; a chamber containing pressure transmitting and multiplying liquid; fluid actuated displacing means for said liquid; floating valve mechanism to control said displacing means; auxiliary arresting means independent of any valve mechanism for arresting the movement of said displacing means, and automatically repeating mechanism relatively to time the operation of said displacing means and of said mold opening and closing means.

140. A hydraulic press comprising in combination a mold, a ram; a liquid containing chamber; a plurality of liquid displacing plungers of different displacement; a check valve between said plungers; mechanical means providing lost motion to time the opening and closing of said check valve for a part of its cycle of operation; and means other than said means providing lost motion to time the opening and closing for another part of said cycle of operation.

141. A hydraulic press comprising in combination a mold; mold opening and closing means; a reciprocating ram; liquid power transmission and pressure multiplying means; fluid actuated reciprocating displacing means having a movement longer than the movement of said ram; means to utilize said longer movement to automatically control the speed of said displacing means; and automatically repeating timing mechanism for said displacing means and for said mold opening and closing means.

142. A hydraulic press comprising in combination a mold; mold filling and ejecting means; a reciprocating ram; liquid power transmission and pressure multiplying means; fluid actuated reciprocating displacing means having a movement longer than the movement of said ram; means to utilize said longer movement to automatically control the speed of said displacing means, and automatically repeating timing mechanism for said displacing means and for said mold filling and ejecting means.

143. A block press comprising in combination a mold; means to open and close said mold having definitely timed cycles of movement; and block compressing means having potentially variable travel, speed and power automatically responsive to the resistance opposed thereto, but within the cycle of movement of said opening and closing means.

144. A hydraulic press comprising in combination a mold; mold opening and closing means; a compressing member and a reciprocatory elastic fluid actuator therefor; liquid power transmission and pressure multiplying means intermediate said actuator and said compressing member; means for furnishing variable power to said actuator automatically responsive to the resistance opposed to said compressing member in one direction and to frictional and mechanical resistance in an opposite direction, and automatically repeating timing means for said actuator and for said mold opening and closing means.

145. A hydraulic press comprising in combination a mold; mold opening and closing means; a receptacle containing power transmitting and pressure multiplying liquid; reciprocating compressing means responsive to the movement of said liquid; fluid actuated reciprocating displacing means, in both of which reciprocating means the stroke displacement is the same; means automatically to control said displacing means in accordance with the resistance opposed thereto, and automatically repeating timing means for said displacing means and for said mold opening and closing means.

146. A hydraulic press comprising in combination a mold; mold filling and ejecting means; a receptacle containing power transmitting and pressure multiplying liquid; reciprocating compressing means responsive to the movement of said liquid; fluid actuated reciprocating displacing means, in both of which reciprocating means the stroke displacement is the same; means automatically to control said displacing means in accordance with the resistance opposed thereto, and automatically repeating timing means for said displacing means and for said mold filling and ejecting means.

147. A press comprising in combination a mold; a mold closing member; means to move relatively said mold and said mold closing member, comprising mechanical means to perform such movement in one direction and fluid pressure means to perform such movement in the opposite direction; said mechanical means acting as a pilot and controller for said fluid pressure means to determine normally the relation between said mold and said mold closing means at all points in their cycle of movement.

148. A press comprising in combination a mold; a mold closing member; means to move relatively said mold and said mold closing member comprising fluid pressure means to actuate such movement in the one direction and mechanical means to actuate such movement in an opposing direction opposed to said pressure, said fluid pressure means having valve mechanism to provide greater pressure when serving as the actuator than when opposing said mechanical means.

149. A hydraulic press comprising in combination a mold; mold closing means; means relatively to change the position of said mold and said mold closing means comprising mechanical means operating in one direction and fluid pressure means operating in the opposite direction, said mechanical means acting as a pilot for said fluid pressure means; a ram; a liquid containing receptacle; means to impart pressure to said liquid, and automatically repeating means to time relatively the operation of said ram and said mold closing means.

150. A press comprising in combination a mold; a movable part; a member to actuate said part in one direction; and fluid pressure means opposing such movement with relatively low pressure and to produce an opposite movement of said part under control of said member by a relatively high pressure.

151. A press comprising in combination a mold; a movable part; a rotary member to actuate said part in one direction; and fluid pressure means opposing such movement with relatively low pressure and to produce an opposite movement of said part under control of said member by a relatively high pressure.

152. A press comprising in combination a mold; means to effect compression therein; a sliding head coöperating with said mold; a cam to move said head in one direction; fluid pressure means to resist such movement with relatively low pressure and to produce opposite movement of said head under control of said cam by relatively high pressure.

153. A press comprising in combination a movable part; a member to actuate said part in one direction; and fluid pressure means opposing such movement with relatively low pressure and to produce an opposite movement of said part under control of said member by a relatively high pressure, and means to vary one of said pressures at will.

154. A press comprising in combination a mold; compressing instrumentalities therefor; a sliding head coöperating with said mold; a cylinder; its piston connected with and to move said head; a cam controlling such movement and to produce movement in an opposite direction opposed by said piston; and means to provide variable exhaust for said cylinder whereby to vary the resistance opposed by said piston to the cam actuated movement of said head.

155. A hydraulic press comprising in combination a mold; a movable member therefor; a ram to operate said member; coöperating fluid transmission means to move said ram; displacing means for said liquid; a sliding head coöperating with said mold; a part connected with and to move said head in one direction and connected with and to determine timing of said displacing means; and fluid pressure means coöperating with said part to oppose the part operated movement of said sliding head by one pressure and to produce opposite part controlled movement by a different pressure.

156. An automatic high speed, high power, hydraulic press comprising in combination the following instrumentalities, namely; a mold; its movable member and ram to operate the same; a chamber containing transmission liquid for said ram and displacing means therefor; a sliding head for said mold; and means including a cam to move the same in one direction and also connected to time the operation of said displacing means; and fluid pressure means opposing said cam operated sliding head movement with relatively low pressure and producing cam controlled opposite movement with relatively high pressure, said cam and coöperating fluid pressure means combining to produce movement of said sliding head from position with said mold open, into position closing said mold, again into position opening said mold, and then to displace the mold contents ejected from the mold and again to mold-filling position.

157. A hydraulic press comprising in combination a mold; a mold cover; means to change the relative positions of said mold and mold cover into three respective positions for filling, compressing and ejecting; fluid pressure means to produce said movement in one direction; mechanically controlled hydraulically transmitted compression means, and mechanical means to determine the positions of rest of said fluid actuated movement.

158. A press comprising in combination a mold; a plunger member; a mold cover; and coöperating mechanical and fluid pressure means to effect change in the relative positions of said mold and mold cover in a direction transverse to the direct line of pressure of said plunger member to present said mold and mold cover in filling, compressing, and ejecting positions, respectively.

159. A press comprising in combination a mold; mold closing means; means to change into three relative positions said mold and said mold closing means; fluid pressure means to produce movement in one direction and mechanical means to determine all of said three positions.

160. A hydraulic block press comprising in combination a mold; pressure responsive means; liquid displacing means; a liquid power transmission system closed during the effective stroke of said responsive means and utilizing a substantially fixed quantity of liquid during each effective stroke thereof, and means whereby said liquid may be kept a substantially fixed volume during each effective stroke thereof.

161. A hydraulic press comprising in combination a mold; a displacing plunger; a reciprocatory ram; a normally fixed quantity of liquid between them during the cycle of movement of said ram; means whereby the amount of liquid may be maintained substantially constant in case of leakage, and automatically repeating timing means for said press.

162. A high speed, automatic, hydraulic block press comprising in combination a mold having a movable member; pressure responsive means to move said member; automatically repeating operating means; a pressure system between said responsive means and said operating means containing a substantially constant body of pressure multiplying and transmitting liquid having means to permit compensation for leakage, and means whereby all of said liquid is utilized in transmitting power from said operating to said pressure responsive means at every cycle of operation of the former.

163. A hydraulic press comprising in combination a mold; pressure responsive means; liquid displacing means; a closed chamber containing substantially a constant body of transmitting liquid intermediate the same; automatically repeating operating means for said press and means to restore said liquid body in case of leakage.

164. A hydraulic press comprising in combination pressure responsive means; liquid displacing means; a pressure system between said means containing a substantially constant body of pressure multiplying and transmitting liquid having leakage compensating means.

165. A block press comprising in combination a mold; a mold plunger and means to operate it; a head; means to change relatively the positions of said mold and head to cause the latter to displace transversely a block ejected from said mold, and a lubricating device constituting also the block displacing face of said head.

166. A block press comprising in combination a mold; a mold plunger; a head; means to change the relative positions of said mold and head to cause the latter to displace a block ejected from said mold, and lubricating means carried by said head to deposit a lubricant upon said mold plunger when elevated, and to be by it transferred to the pressure receiving portion of said head on the block displacing stroke.

167. A hydraulic press comprising in combination a mold; mold opening means; a ram; a chamber containing power transmission liquid; displacing means for said liquid; said mold opening means and said displacing means being automatically timed from a common source, but otherwise independently operated.

168. A hydraulic press comprising in combination a mold; a ram; automatically and successively operating liquid displacing plungers of different displacement; the displacement of said plungers on the compressing stroke and the displacement of said ram on the return stroke being equal, and automatically repeating timing means for said press.

169. A hydraulic press comprising in combination a mold; mold opening and closing means; a compressing member; a liquid containing chamber; direct acting liquid displacing means; a fluid actuator for said displacing means; valve mechanism to time said fluid actuator and auxiliary controlling means for said displacing means independent of said valve mechanism.

170. A high speed, high power, hydraulic press comprising a mold; mold filling and ejecting means; compressing means; fluid actuated reciprocatory displacing means; liquid power transmission and pressure multiplying means intermediate said displacing means and said compressing means; means automatically to restrain impact of said displacing means in the absence of substantial resistance opposed to movement thereof, and automatically controlled timing means to cause operation of said compressing, filling and ejecting means at each cycle of operation of said displacing means.

171. A hydraulic press comprising in combination a mold; a compressing member; actuating means therefor; fixed controlling means effective only at or near the limit of movement of said actuating means, and automatically variable controlling means effective at other times.

172. A press containing in combination a head, a mold, means relatively to change the position of said head and mold for filling, covering and uncovering, and automatically controlled follow-up fluid actuated compressing means.

173. A press containing in combination a head, a mold, means relatively to change the position of the same for filling, covering and uncovering said mold and automatically controlled follow-up compression means.

174. A block press comprising in combination a mold having a movable member; means to open and close said mold; fluid actuated operating means for said movable mold member; a timing member connected for movement in definite relation to movement of said mold opening and closing means; and a valve mechanism for said actuating means controlled by said timing member, the latter having the capacity for leading over said valve mechanism to produce variation in the actuating pressure for said movable mold member.

175. A hydraulic press comprising in combination a mold; means to open and close said mold; a ram; a fluid actuated displacing plunger; transmission liquid between said plunger and said ram; a timing cam connected for definite movement with relation to movement of said mold opening and closing means; valve mechanism for said displacing plunger controlled by said cam, said cam having the capacity for leading over said valve mechanism to produce corresponding variation in the actuating pressure for said plunger.

176. A hydraulic press, single cycle initially and throughout, comprising in combination a mold; mold opening and closing means; mold filling and ejecting means; compressing means; liquid power transmission and pressure multiplying means; elastic fluid actuated direct acting displacing means for said liquid; automatic controlling means for said displacing means, and automatically repeating means for relatively timing the operation of said displacing, opening, closing, filling and ejecting means within said single cycle.

177. A high speed, high power, automatic hydraulic press comprising in combination a mold; means to open and close said mold;

a liquid containing chamber; a compressing member for said mold responsive to movement of said liquid, and an elastic fluid operated prime mover for said liquid, every cycle of operation of which moves said compressing member through its entire compressing movement.

178. A block press comprising in combination a mold; means to open and close said mold having definitely timed automatic cycles of movement and block compressing means having a variable movement under variable pressure but within every cycle of movement of said opening and closing means.

179. A hydraulic press comprising in combination a mold responsive means; transmission liquid; single cycle displacing means for said liquid, one of said means being actuated in one direction by gravity and in the other direction by fluid pressure, and automatically repeating timing means for said press.

180. A high speed, high power, hydraulic, block press, single cycle initially and throughout, comprising in combination a mold; means to open and close it; a displacing plunger; a ram; a liquid containing chamber intermediate said displacing plunger and said ram; means to shift the relative positions of said mold and said mold opening and closing means in a direction transverse to the line of direct pressure of said ram; a mold plunger forming the bottom surface of said mold and having a substantially perpendicular upward movement on its compressing stroke, a relief movement to permit opening said mold and a further upward movement to eject the contents of said mold, a mold filling conduit operated by gravity on retraction of said compressing plunger to fill said mold, said mold plunger having a variable drop to vary the capacity of said mold; block removing mechanism to remove said blocks, and automatically repeating timing means to open, fill and close said mold and compress, eject and remove a finished block during each cycle of operation of said displacing plunger.

181. A hydraulic press comprising in combination a mold; a compressing member for said mold forming the bottom surface of said mold; a pressure receiving member for said mold; means automatically to move said mold and pressure receiving member into and out of pressure applying relation; mold filling and ejecting means; liquid power transmission means; pressure means to apply a potentially constant pressure upon the contents of said mold during a part of the compression thereof and a higher potentially constant pressure thereof during the remainder of the compression thereof, and automatically repeating timing means to cause said compressing member and said mold filling and ejecting means each to make one cycle of operation during each cycle of operation of said pressure means.

182. A high speed, high power, automatic, hydraulic press comprising in combination a mold; a compressing ram therefor; a displacing plunger; a body of transmission liquid operatively connecting said plunger and ram; and a liquid chamber so organized with relation to said ram and plunger to substantially eliminate speed restrictive friction of said liquid in the operation of said press and means automatically to time the operation of said parts.

183. A high speed, high power, automatic, hydraulic press comprising in combination a mold; a compressing ram therefor; a displacing plunger; a body of transmission liquid operatively connecting said plunger and ram; a liquid containing chamber, said chamber, ram and plunger being of such relative dimensions and so concentrated as to eliminate speed restrictive friction of said liquid in the operation of said press, and means automatically to time the operation of said parts.

184. A hydraulic press comprising in combination a mold; means to open and close said mold; a liquid containing chamber; a compressing member responsive to movement of liquid in said chamber; means to shift the relative positions of said mold and mold opening and closing means in a direction transverse to the line of direct pressure of said compressing means; fluid actuated displacing means for said liquid, and means to cause operation of said instrumentalities to effect compression of material in said mold in steps or stages with an interval between them.

185. A hydraulic press comprising in combination a mold; compressing means for said mold; displacing means; a receptacle between said displacing means and said compressing means; a substantially fixed quantity of pressure transmitting liquid during the compression and return strokes of said compression means and means to effect a part of the compression upon the contents of said mold under one potential pressure and a part thereof under a higher potential pressure.

186. A hydraulic press comprising in combination a mold; means to open and close said mold; a liquid containing chamber; a ram responsive to movement of liquid in said chamber; displacing means to cause displacement of liquid in said chamber said ram having a movement in a direction transverse to the direction of movement of said displacing means, and means to effect a relative movement of said displacing means in steps or stages to produce corresponding step compression of the contents of said mold.

187. A hydraulic press comprising in combination a mold; mold filling means; a compressing member for said mold; liquid pressure multiplying and transmitting means; displacing means for said liquid, said compressing member having a movement in a direction transverse to the direction of movement of said displacing means; means responsive normally only to the movement of said displacing means to move said compressing member, and means automatically to time the operation of said displacing means relatively to the operation of said filling means.

188. A hydraulic press comprising in combination a mold; filling and ejecting means therefor; compressing means; fluid actuated displacing means; means connected to said displacing means to control the movement thereof, and means automatically to time the operation of said displacing means relative to the operation of said filling and ejecting means.

189. A hydraulic press comprising in combination a mold; mold filling and closing means; a ram; liquid displacing means; a closed chamber constantly filled with a substantially constant body of power transmitting liquid intermediate said ram and said displacing means, the former being operated on its return stroke by the combined action of gravity and atmospheric pressure; means to shift the relative positions of said mold and said mold filling and closing means in a direction transverse to the line of direct pressure of said ram, and automatically repeating operating means for said press.

190. A hydraulic press comprising in combination a mold; mold filling and ejecting means; a ram; liquid displacing means, said ram having a movement in a direction transverse to the direction of movement of said displacing means; a closed chamber constantly filled with a substantially constant body of power transmitting liquid intermediate said ram and said displacing means, the former being operated on its return stroke by the combined action of gravity and atmospheric pressure, and automatically repeating operating means for said press.

In testimony whereof, I have signed my name to this specification, in the presence of two subscribing witnesses.

GEORGE E. WHITNEY.

Witnesses:
IRVING U. TOWNSEND,
EVERETT S. EMERY.

Copies of this patent may be obtained for five cents each, by addressing the "Commissioner of Patents, Washington, D. C."